(12) United States Patent
Chantz

(10) Patent No.: US 10,567,420 B2
(45) Date of Patent: Feb. 18, 2020

(54) BIOLOGY BASED TECHNIQUES WITH COGNITIVE SYSTEM ANALYSIS FOR HANDLING INFORMATION SECURITY AND PRIVACY

(71) Applicant: International Business Machines Corporation, Armonk, NY (US)

(72) Inventor: Hyman D. Chantz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 15/345,755

(22) Filed: Nov. 8, 2016

(65) Prior Publication Data
US 2018/0131716 A1 May 10, 2018

(51) Int. Cl.
*G06F 11/00* (2006.01)
*H04L 29/06* (2006.01)

(52) U.S. Cl.
CPC .. *H04L 63/1441* (2013.01); *G06F 2221/2101* (2013.01)

(58) Field of Classification Search
CPC ............... H04L 63/1441; G06F 21/554; G06F 2221/2101
USPC .......................................................... 726/23
See application file for complete search history.

(56) References Cited

U.S. PATENT DOCUMENTS

| | | | |
|---|---|---|---|
| 8,018,943 B1 | 9/2011 | Pleshek et al. | |
| 8,335,238 B2 | 12/2012 | Arimilli et al. | |
| 8,407,160 B2 * | 3/2013 | Cretu | H04L 63/14 706/12 |
| 8,646,090 B1 | 2/2014 | Gadde et al. | |
| 9,003,528 B2 | 4/2015 | Stolfo | |
| 9,075,410 B2 | 7/2015 | Ohkado et al. | |
| 10,120,746 B1 * | 11/2018 | Sharifi Mehr | G06F 11/079 |
| 2003/0188189 A1 | 10/2003 | Desai et al. | |
| 2011/0138470 A1 * | 6/2011 | Davis | G06F 21/564 726/25 |

(Continued)

OTHER PUBLICATIONS

List of IBM Patents or Patent Applications Treated as Related, Aug. 10, 2017, 2 pages.

(Continued)

*Primary Examiner* — Samson B Lemma
(74) *Attorney, Agent, or Firm* — Stephen J. Walder, Jr.; Jeffrey S. LaBaw

(57) ABSTRACT

Mechanisms are provided in which an electronic corpus of content specific to a domain of computer system attacks is ingested and cognitively analyzed to identify at least one instance of a reference to a computer attack and at least one corresponding characteristic of the computer attack. The mechanisms generate an attack profile data structure for the computer attack based on the at least one corresponding characteristic of the computer attack identified by the cognitive analysis of the content of the electronic corpus. A local segment analysis and security (LSAS) engine, associated with a segment of a distributed computing system, is configured based on the attack profile data structure. The LSAS engine determines a security response action to implement based on the attack profile data structure and transmits a control message to at least one computing resource to implement the determined security response action in response to detecting the computer attack.

22 Claims, 10 Drawing Sheets

(56) References Cited

U.S. PATENT DOCUMENTS

| | | | |
|---|---|---|---|
| 2011/0231510 A1* | 9/2011 | Korsunsky | G06F 21/55 709/213 |
| 2011/0247072 A1* | 10/2011 | Staniford | H04L 63/1416 726/24 |
| 2012/0324572 A1* | 12/2012 | Gordon | H04L 63/1458 726/22 |
| 2016/0012235 A1* | 1/2016 | Lee | G06Q 10/0635 726/25 |
| 2016/0088000 A1* | 3/2016 | Siva Kumar | H04L 63/083 726/23 |
| 2016/0308898 A1 | 10/2016 | Teeple et al. | |
| 2017/0147942 A1* | 5/2017 | Gao | G06N 7/005 |
| 2017/0214701 A1* | 7/2017 | Hasan | H04L 63/1408 |
| 2017/0310702 A1 | 10/2017 | Chantz | |
| 2018/0351783 A1* | 12/2018 | Patrich | H04L 41/0636 |

OTHER PUBLICATIONS

"Computer Immune Systems", Computer Science Department, Farris Engineering Center, University of New Mexico, http://www.cs.unm.edu/~immsec/research.htm, Accessed from the Internet on Feb. 23, 2017, 1 page.

"New to Artificial Immune Systems?", The Online Home of Artificial Immune Systems, AISWeb, http://www.artificial-immune-systems.org/people-new.shtml, Oct. 2013, 4 pages.

Amin, Reham et al., "Biometric and Traditional Mobile Authentication Techniques: Overviews and Open Issues", Bio-inspiring Cyber Security and Cloud Services: Trends and Innovations, Intelligent Systems Reference Library 70, Chapter 16, 2014, pp. 423-446.

Burgess, Mark, "Biology, Immunology and Information Security", Information Security Technical Report, vol. 12 Issue 4, Oct. 2007, pp. 192-199.

Burgess, Mark et al., "Computer Immunology", Proceedings of the Twelfth Systems Administration Conference (LISA '98), Dec. 6-11, 1998, 17 pages.

Chantz, HY, "Systems Biology Implications for Cloud Computing Security", ELEN 6010, May 14, 2015, 13 pages.

Chantz, HY, "Systems Biology Implications for Cloud Computing Security", ELEN 6010, Spring 2015, May 12, 2015, 30 pages.

D'Haeseleer, Patrik et al., "An Immunological Approach to Change Detection: Algorithms, Analysis and Implications", IEEE Symposium on Security and Privacy, 1996, http://www.cs.unm.edu/~immsec/publications/ieee-sp-96-neg-selec.pdf, May 1996, 10 pages.

Forrest, Stephanie et al., "A Sense of Self for Unix Processes", In Proceedings of the 1996 IEEE Symposium on Security and Privacy, http://www.cs.unm.edu/~immsec/publications/ieee-sp-96-unix.pdf, May 1996, 9 pages.

Forrest, Stephanie et al., "Computer Immunology", Communications of the ACM, vol. 40, No. 10, Oct. 1997, pp. 88-96.

Forrest, Stephanie et al., "Computer Immunology", Dept. of Computer Science, University of New Mexico, Mar. 21, 1996, 18 pages.

Forrest, Stephanie et al., "Computer Immunology", Dept. of Computer Science, University of New Mexico, Oct. 29, 2006, http://www.cs.unm.edu/~forrest/publications/computer-immunology.pdf, 43 pages.

Forrest, Stephanie, "Sensitive Data in a Wired World Negative Respresentations of Data", Dept. of Computer Science, Univ. of New Mexico, Accessed from the Internet on Feb. 23, 2017, http://www.cs.yale.edu/homes/jf/Forrest.ppt, 20 pages.

Gaber, Tarek et al., "An Overview of Self-Protection and Self-Healing in Wireless Sensor Networks", Bio-inspiring Cyber Security and Cloud Services: Trends and Innovations, Intelligent Systems Reference Library 70, Chapter 7, 2014, pp. 185-202.

George, Selvin et al., "A Biological Programming Model for Self-Healing", SSRS '03, Oct. 31, 2003, http://www.cs.virginia.edu/~evans/pubs/ssrs.pdf, 10 pages.

Goel, Sanjay et al., "Biological Models of Security for Virus Propagation in Computer Networks", ;LOGIN, Dec. 2004, pp. 49-56.

Haris, S.H.C. et al., "Anomaly Detection of IP Header Threats", International Journal of Computer Science and Security, (IJCSS), vol. (4): Issue (6), Jan. 2011, 9 pages.

Hofmeyr, Steven A. et al., "Immunity by Design: An Artificial Immune System", Dept. of Computer Science, University of New Mexico, Accessed from the Internet on Feb. 23, 2017, http://www.cs.unm.edu/~immsec/publications/gecco-steve.pdf, 8 pages.

Hofmeyr, Steven, "The implications of immunology for secure systems design", Computers & Security, vol. 23, Issue 6, Sep. 2004, pp. 453-455.

Jamdagni, Aruna et al., "Intrusion Detection Using Geometrical Structure", 2009 International Conference on Frontier of Computer Science and Technology, Dec. 17-19, 2009, pp. 327-333.

Levin, Carol, "Biology Battles PC Viruses", PC Magazine, Apr. 9, 1996, p. 34.

Norton, Steven, "CIO Explainer: What is Blockchain?", The Wall Street Journal, CIO Journal, Feb. 2, 2016, Accessed from the Internet on Sep. 15, 2016, https://blogs.wsj.com/cio/2016/02/02/cio-explainer-what-is-blockchain/, 7 pages.

Roberts, Jeff J., "Why Accenture's Plan to 'Edit' the Blockchain Is a Big Deal", Pointcloud, http://fortune.com/2016/09/20/Accenture-blockchain/, Sep. 20, 2016, 6 pages.

Shen, Junyuan et al., "An Improved Artificial Immune System-Based Network Intrustion Detection by Using Rough Set", Communications and Network, vol. 4, http://www.scirp.org/journal/PaperDownload.aspx?paperID=17496, Feb. 2012, pp. 41-47.

Somayaji, Anil et al., "Principles of a Computer Immune System", New Security Paradigms, Workshop, 1997, Accessed from the Internet on Feb. 23, 2017, http://www.cs.unm.edu/~immsec/publications/nspw-97.pdf, pp. 75-82.

Yang, Jin et al., "Cloud Computing for Network Security Intrusion Detection System", Journal of Networks vol. 8, No. 1, Jan. 2013, pp. 140-147.

List of IBM Patents or Patent Applications Treated as Related, Oct. 23, 2018, 2 pages.

* cited by examiner

BIOLOGY BASED TECHNIQUES WITH COGNITIVE SYSTEM ANALYSIS FOR HANDLING INFORMATION SECURITY AND PRIVACY

BACKGROUND

The present application relates generally to an improved data processing apparatus and method and more specifically to mechanisms for providing biology based techniques and cognitive system analysis for handling information security and privacy.

Correspondence between biological diseases and computer-based problems has been remarked upon for several decades. There has been much attention paid to computer viruses, which has spawned an entire field of "computer immunology". For example, in his paper "Computer Immunology," Proceedings of the Twelfth Systems Administration Conference (LISA '98), Dec. 6-11, 1998, Mark Burgess commented on the fragile nature of modern computer systems and their unreliability as well as the comparability of biological and social systems with computer systems such that, similar to such biological and social systems, computing systems need self-healing processes which eliminate or minimize the dependence on human involvement.

Stephanie Forrest, Steven Hofmeyer, and Anil Somayaji described, in their paper entitled "Computer Immunology," Department of Computer Science, University of New Mexico, Mar. 21, 1996, the correspondence between biological systems and computing systems and that this correspondence is a compelling reason to consider for improving computer security. In another publication also entitled "Computer Immunology," Department of Computer Science, University of New Mexico, Oct. 29, 2006, Stephanie Forrest and Catherine Beauchemin describe a body of work that constructs computational immune systems that behave analogously to the natural immune system. These artificial immune systems (AIS) simulate the behavior of a natural immune system and, in some cases, have been used to solve practical engineering problems, such as computer security.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising instructions which are executed by the at least one processor to configure the data processing system to implement a local segment analysis and security (LSAS). The method comprises ingesting, by the LSAS cognitive computing system, an electronic corpus of content. The electronic corpus of content comprises content specific to a domain of computer system attacks. The method further comprises performing, by the LSAS cognitive computing system, cognitive analysis of the content of the electronic corpus to identify at least one instance of a reference to a computer attack and at least one corresponding characteristic of the computer attack. Moreover, the method comprises generating, by the LSAS cognitive computing system, an attack profile data structure for the computer attack based on the at least one corresponding characteristic of the computer attack identified by the cognitive analysis of the content of the electronic corpus. In addition, the method comprises configuring, by the LSAS cognitive computing system, at least one LSAS engine associated with a segment of a distributed computing system based on the attack profile data structure. The at least one LSAS engine determines a security response action to implement based on the attack profile data structure and transmits a control message to at least one computing resource to implement the determined security response action in response to detecting the computer attack.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
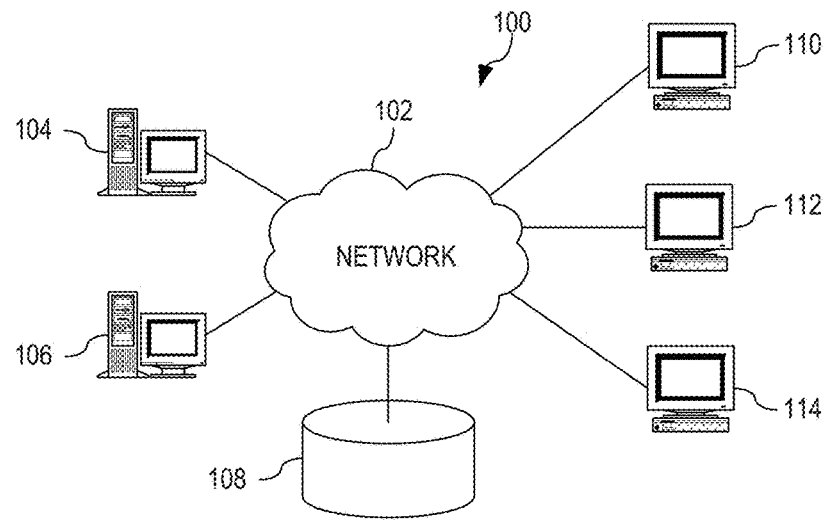
FIG. 1 is an example diagram of a distributed data processing system in which aspects of the illustrative embodiments may be implemented.

The illustrative embodiments provide mechanisms for addressing aspects of computing system intrusion by modeling the solution after biological responses to biological intrusions, such as biological viruses. In particular, the mechanisms of the illustrative embodiments are directed to a "swelling" aspect of a computing system intrusion and providing security and privacy countermeasures to address this swelling aspect. The biological concept of "swelling", which provides locally-determined scaffolding, dilution, and segmentation of an area under stress or attack, is used to model the solutions provided by the mechanism of the illustrative embodiments. The mechanisms of the illustrative embodiments may be applied to stand alone or distributed data processing system environments. In some illustrative embodiments, the mechanisms will be described in the context of a cloud computing environment, however the illustrative embodiments are not limited to such.

As mentioned above, there has been much discussion as to how there is a correlation between biological systems and computing systems. Such discussion even, at times, generally supports looking at biological systems to model computer based systems to address certain issues. However, such discussions do not adequately provide solutions for addressing such issues, rather just general guidelines.

One area of specific interest is the area of computer security and data privacy. As mentioned above, with regard to such areas, interest is primarily directed to computer viruses and immunizing computer systems against computer viruses in a similar manner to the way in which biological viruses are treated.

In the early ages of medicine, a few key motifs were used to describe disease processes and provide for symptoms and sensing as guides to repair. A famous rubric of Aelius Galenus (c. 169 AD) was: "Calor, dolor, rubor, tumor" which roughly means that disease symptoms to be sensed and addressed during treatment are heat, pain, redness and swelling. In the modern age, the operation of "sensing" has become more of an electronic operation which permits the storing, transmission, and manipulation of the sensed information, i.e. electronic sensing with the resulting data being able to be stored, transmitted, and manipulated.

Taking Galenus' rubric as an example, a general biological response to an intrusion, assault, or physiological insult, as may be experienced due to a biological virus, can be equated to a modern computing system's response using the following comparison table:

TABLE 1

Comparison of Biological and Computer System Intrusion Aspects

| | Biological Intrusion Aspect | Computing System Intrusion Aspect |
|---|---|---|
| Calor | Heat | Activation of Defenses |
| Dolor | Pain | Alerting |
| Rubor | Redness | Identification |
| Tumor | Swelling | ? |

In the discussions of how to model computing systems after biological systems with regard to providing artificial immune systems for these computing systems, only the calor, dolor, and rubor aspects have been addressed, i.e. by way of providing automated mechanisms for activation of defenses, alerting when there is an intrusion, and identification of the type of intrusion. Existing mechanisms, and known literature directed to this issue, do not provide an adequate solution for addressing the tumor aspect, i.e. the "swelling" biological aspect, when considering automated mechanisms for immunizing computer systems. The present invention addresses the "swelling" or tumor aspect of a computer system as a security and privacy countermeasure issue and provides automated mechanisms for addressing such issues.

For example, when a human body is subjected to an injury, such as a bee sting, sprain, or the like, the body responds, in part, by having a swelling reaction that is initially objectionable, but ultimately is curative in nature. In the context of a bee sting, for example, the swelling provides dilution of the venom, segmentation of the affected area from the rest of the body preventing or minimizing the spread of the venom, and scaffolding or support of the repair mechanism for repairing the harm done to the body. In a similar manner, segmentation, dilution, and scaffolding may be applied to computing systems. With regard to segmentation, mechanisms for quarantining and segregation, portions of the computing system may be utilized to provide similar segmentation results to a biological swelling reaction. Regarding dilution, mechanisms for rapid creation or redirection of traffic to micro-environments or providing sandboxing may be utilized to provide a similar dilution result as in a biological swelling reaction. With regard to scaffolding, mechanisms for providing compensating controls and temporary delay of operations may be utilized to provide similar scaffolding results to that of biological swelling reactions.

In order to provide a context in which to describe the various mechanisms for implementing the segmentation, dilution, and scaffolding aspects of attack or intrusion response in a computing system, a description of a computing environment in which these aspects may be implemented will first be described. While the computing environment is described as a distributed data processing system which may implement cloud computing mechanisms, it should be appreciated that the present invention is not limited to such and may be utilized with any computing environment in which the mechanisms for segmentation, dilution, and scaffolding operations may be performed in response to detected attacks or intrusions. Such computing environments may include stand-alone computing devices coupled to a data network and which communicate with other devices via a data network, local area networks of computing devices, wide area networks of computing devices, or the like.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
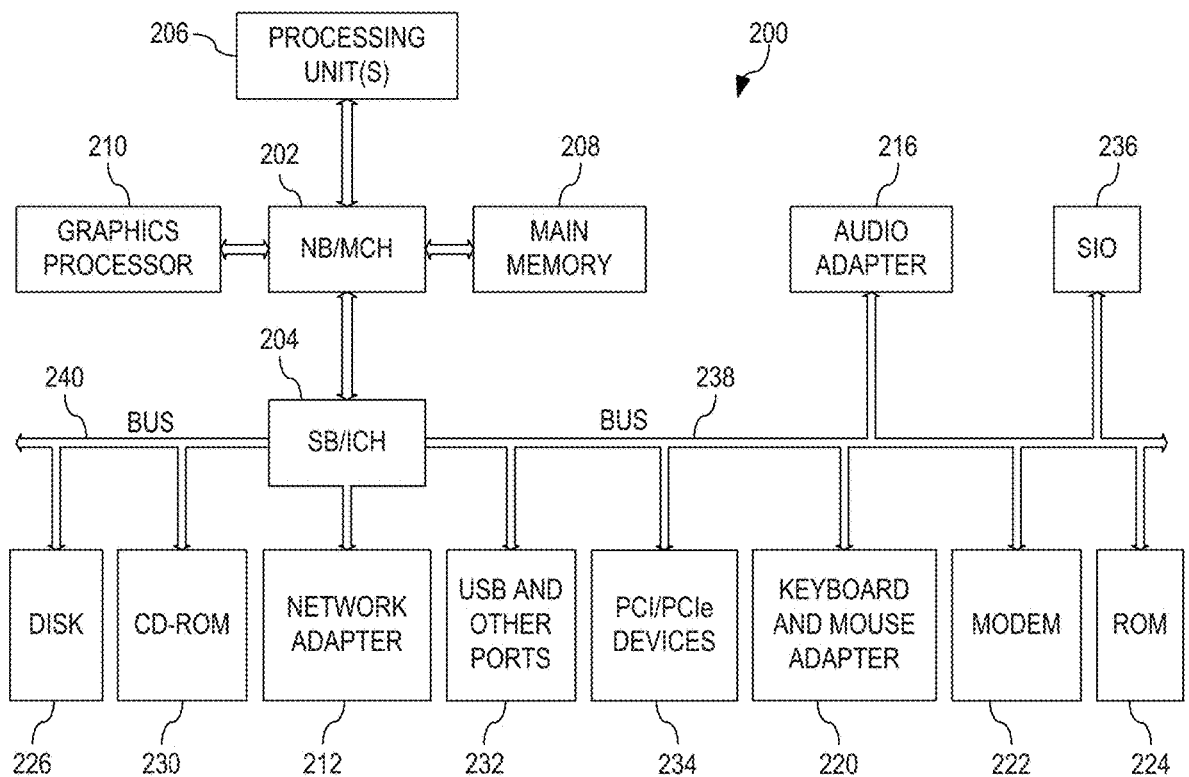
FIG. 2 is an example block diagram of a computing device in which aspects of the illustrative embodiments may be implemented.

As noted above, the illustrative embodiments may be utilized in many different types of data processing environments. FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Although not shown in FIG. 1, it should be appreciated that the distributed data processing system may comprise various routers, switches, and other hardware and software mechanisms for facilitating the communication of data between computing devices (these are generally represented as the cloud representing network 102 in FIG. 1). Moreover, the network 102 may be comprised of a plurality of data networks coupled to one another via edge devices, such as edge routers, edge servers, or the like, which provide a communication pathway between the various data networks, e.g., local area networks, private networks, and the like. The various individual data networks that may collectively be represented by network 102 may be associated with particular geographic regions, organizational departments or other portions of an organization, associated with various portions of a defined network topology, or any other grouping or stratification of a real or virtual topology.

In accordance with the mechanisms of the illustrative embodiments, one or more of the computing devices, e.g., server 104, routers, switches, or other element of the network 102 infrastructure may be specifically configured to implement a local segment analysis and security (LSAS) engine. Alternatively, a dedicated hardware logic device or computing device configured with, and executing, software may be provided for implementing such a LSAS engine. The configuring of the computing device, or dedicated device, may comprise the providing of application specific hardware, firmware, or the like to facilitate the performance of the operations and generation of the outputs described herein with regard to the illustrative embodiments. The configuring of the computing device/dedicated device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates a security response to detected attacks or intrusions that involves providing segmentation, dilution, and scaffolding reactions to detected attacks or intrusions modeled on biological responses to bodily attacks.

In some illustrative embodiments, the distributed data processing system 100 in FIG. 1 is segmented into a plurality of initial segments representing localized networks of computing devices, which may then be dynamically segmented further into sub-segments in response to a detected attack or intrusion in accordance with the illustrative embodiments as described hereafter. While these localized networks are considered "localized", the networks themselves may be local area networks, private networks, or even wide area networks. The term "localized" refers to the segments being self-contained associations of computing devices and the data network infrastructure for providing data communication between these computing devices. The localized networks may communicate with other localized networks via edge devices, such as edge routers, edge servers, gateway devices, and the like, which stand on the edge of the localized network between it and other networks. The edge device preferably includes a local segment analysis and security (LSAS) engine configured in accordance with one or more of the illustrative embodiments described herein. Each segment may have one or more LSAS engines associated with one or more computing devices of the segment, which may be edge devices or other devices associated with the segment. For purposes of the following discussion, it will be assumed that the LSAS engine is implemented as software instructions loaded into memory and executed so as to configure an edge device, such as a router, switch, server computing device or the like, to implement the LSAS engine.

The LSAS engine operates to monitor operations and conditions within its own associated segment and communicate with LSAS engines associated with other segments. The LSAS engine may interface with software/hardware agents executing on various resources, e.g., computing devices, storage devices, data communication devices (e.g., routers, switches, etc.), and the like, within the LSAS engine's associated localized network in order to collect information about the status and operation of these various resources. For example, various measures of operation may be calculated and returned by the software/hardware agents including bandwidth availability/utilization, processor cycle utilization, storage utilization, throughput, error rates, data traffic pattern information, indications of detected attacks or intrusion attempts, e.g., access requests for accessing resources which are detected to be an attack or attempt to access data without sufficient access rights or permissions, and the like. The software/hardware agents may report information various hardware and software resources within the localized network.

The LSAS engine collects information from the agents in the localized network to capture a representation of a normal operating state of the localized network with regard to a plurality of numerical criteria-based indications of status. For example, when no significant error conditions are detected, no significant attacks or intrusions are detected, and the like, a baseline status of the localized network is collected from the agents to generate a set of numerical representations of statistical measures indicative of a normal state of the localized network, e.g., a normal statistical measure of bandwidth utilization, throughput, processor utilization, storage utilization, data packet payload size and timing for data communications to/from one or more resources, and the like, for the various resources in the localized network. This provides a multi-axis representation of the normal operating state of the localized network. It should be appreciated that such a multi-axis representation of the localized network may be generated on a global scale for the entire localized network, for portions of the localized network, for individual resources within the localized network, or any combination of the above.

As attacks or intrusions are attempted on one or more of the resources of the localized network, the agents will report information to the LSAS engine indicating a deviation from the normal operating state of the localized network. For example, bandwidth utilization may spike, processor cycle utilization may dramatically increase, particular traffic patterns, or patterns of access attempts may be detected, particular types of accesses may be reported, particular virus instances may be reported, and the like. In some illustrative embodiments, numerical criteria-based indications of status in the multi-axis representation of localized network may be reported that deviate from the normal operating state by an amount equal to or greater than a predetermined threshold. Mechanisms for identifying various computer based attacks or intrusions in computer networks are well known in the art and thus, a more detailed explanation is not presented herein. Any known or later developed mechanism for detecting an attack or intrusion may be used without departing from the spirit and scope of the present invention.

When an attack or intrusion is detected by an agent, or the LSAS engine based on metrics reported by the agents, an abnormal state may be present which requires a response in accordance with the illustrative embodiments to allow for segmentation, dilution, and scaffolding. With regard to the responsiveness of the LSAS engine to a detected attack or intrusion, the LSAS engine may implement segmentation mechanisms for segmenting the LSAS engine's associated initial segment into sub-segments and/or begin to isolate the initial segment from other segments associated with other LSAS engines. Isolation, or segmentation, of the initial segment is achieved through inter-segment and/or intra-segment bandwidth throttling at the LSAS engine which sends control signals to the routers/switches of the segment to control the throughput of the routers/switches and available bandwidth for various communications to the initial segment and/or portions of the initial segment.

Thus, when an attack or intrusion is detected within the segment associated with the LSAS engine, the bandwidth throttling is initiated so as to segment or isolate the affected portion of the segment from other portions of the computing system. In a cloud computing environment, for example, a first segment of the cloud computing system may experience an attack, such as a denial of service attack, port scanning, spoofing attack, "ping of death" attack, unauthorized access attempt, or any other type of passive or active attack, and the LSAS engine of that particular segment will then identify the location of the portion of the segment, or the segment as a whole, as the target of the attack and will proceed to gradually isolate the affected area through bandwidth throttling as is achieved through control signals sent to routers, switches, and other devices that control the flow of data traffic to and from the affected area of the segment, e.g., the particular computing device or devices affected. This is similar to the biological response to an attack on a biological system whereby the system responds by beginning to swell the affected biological area and thereby cut off or slow down the spread of the foreign matter into other areas of the biological system.

In addition, the LSAS engine may transmit notifications to other LSAS engines with which it is registered to inform those LSAS engines of the detected attack/intrusion and the resulting response initiated by the LSAS engine. Similarly, the LSAS engine may also receive notifications from other LSAS engines that are registered with it so as to become informed of attacks/intrusions occurring in other segments of the computing system. In addition to throttling bandwidth to/from portions of the segment associated with the LSAS engine, the LSAS engine, in response to receiving information that other segments to which it is coupled through an edge device are experiencing their own attacks/intrusions, may throttle bandwidth of data traffic flowing to/from the other segments experiencing such attacks/intrusions. As a result, the LSAS engine is able to segment, or isolate portions of its own segment from other portions of the segment as well as isolate or segment itself from other segments associated with other LSAS engines. Of course, segmentation or isolation of the segment from other segments may be performed even in situations where there is no attack or intrusion detected within the LSAS engines' own segment.

The particular amount of bandwidth throttling performed may be determined based on a variety of different characteristics of the detected attack or intrusion. These characteristics may include the nature of the attack, the origin of the attack, a determined degree of severity of the attack, and the like. For example, a first segment may be associated with Dallas, Tex. and the LSAS engine associated with this segment of the computing system may receive notifications from the LSAS engine associated with the San Antonio, Tex. segment indicating that the San Antonio segment is experiencing a large number of viruses, that the viruses are of the type that is known to originate from a source in North Korea, and that the severity of the effects of the virus as well as the number of instances indicate a relatively high severity. In such a case, the bandwidth of data traffic flowing between the Dallas segment and the San Antonio segment may be throttled to reduce the amount of data flowing between the two segments.

As the severity of the attacks/intrusions increase, the level of throttling may be increased so as to further segment or isolate the affected areas of the computing system. Thus, the LSAS engine may maintain a history of the status of the segment associated with the LSAS engine and the other segments associated with the other registered LSAS engines. The trend in status of the segment and other registered segments may be evaluated periodically to determine whether the throttling of the bandwidth should be increased or reduced. Corresponding control signals are sent to the computing devices, routers, switches, and other data traffic routing mechanisms to facilitate the increase/reduction in bandwidth to the affected segments, or portions of segments.

In addition to, or alternative to, a segmentation response to a detected attack or intrusion, the LSAS engine may perform a dilution response. The dilution response may take the form of a deliberate introduction of innocuous messages that dilute the amount of attack or intrusion based messages processed by the segment or computing system thereby slowing down the ability of the attacker. The introduction of innocuous messages reduces the available bandwidth to attack or intrusion messages and thus, dilutes the attack or intrusion messages. The LSAS engine may generate such dilution data packets or messages that are processed by the segment resources in a normal manner but which do not affect the state of the segment resources other than to dilute the attack or intrusion traffic.

The dilution response may also take the form of sandboxing and/or utilizing a honeypot mechanism. Sandboxing is a process by which data traffic is isolated to a defined set of processes that do not adversely affect the segment or computing system. A sandbox is a security mechanism for separating, or separating a portion of, the computing system from other portions of the computing system so as to minimize the potential spread of attack or intrusion. For example, the sandbox may comprise processes that do not perform any actual work in the computing system but may appear to be performing actual processes to external processes that may be a source of the attack or intrusion. For example, if the attack or intrusion is directed to a segment tasked with controlling a ventilation fan of a facility, the sandbox may virtually represent the ventilation fan and appear to the externa processes as if the actual ventilation fan is being controlled or accessed when in fact the virtualized ventilation fan is actually being manipulated and no real effect on the computing system is actually being performed. In this way, the attack is quarantined and kept from affecting the actual resources of the computing system.

In a similar manner, the dilution response may utilize a honeypot mechanism in which a "honeypot" of data, simulated systems, or the like, may be established and traffic detected to be part of an attack or intrusion is redirected to the "honeypot" which is one or more pseudo-data data structures. The pseudo-data data structures resemble actual data but in fact present fake or pseudo-data that will not negatively affect the organization associated with the data processing system if the pseudo-data is accessed by virtue of an attack or intrusion. The use of a honeypot is a deception trap designed to entice an attacker into attempting to compromise the honeypot rather than other resources of the computing system where actual data is present. When deployed correctly, the honeypot serves as an early-warning and advanced security surveillance tool, minimizing the risks of attacks on the other resources of the segment or computing system.

A graduated approach to performing the dilution response may be utilized in a similar manner to the mechanisms for throttling the bandwidth both within and between segments of the computing system. The LSAS engine may begin with dilution of the traffic to/from the affected sub-segment or the segment as a whole by introducing innocuous data packets or messages into the data traffic. As the LSAS engine of the segment continues to monitor the status of its own segment and other registered segments, if the characteristics of the attack indicate an increase in the severity of the attack, the dilution may be performed by switching the data communication traffic to a sandbox traffic channel where the data packets or messages are handled by a defined set of sandbox processes that do not affect the state of the other segment resources or computing system resources. Alternatively, the traffic may be redirected to a honeypot data set or set of processes that comprise fake data or virtualized processes that do not affect the remainder of the segment or computing system and do not provide valid data.

Whether using a segmentation response, dilution response, or both, the mechanisms of the LSAS engines may further provide mechanisms for providing a scaffolding response. The scaffolding response provides mechanisms for providing post-event countermeasures to regain normal operation of the segment, sub-segment, or computing system. These mechanisms may include an alternate communication channel that is maintained in reserve for use in case an attack or intrusion is detected. In the case of a detected attack or intrusion, and the initiation of the segmentation and/or dilution responses, the LSAS engine may enable the alternate communication channel through which control messages may be transmitted from the LSAS engine and other recovery systems to access segment resources and regain normal operation of the resources.

As noted above, the mechanisms of the illustrative embodiments utilize specifically configured computing devices, routers, switches, dedicated hardware and/or software devices, or other data processing systems, to perform the operations for providing segmentation, dilution, and/or scaffolding response to a detected attack or intrusion, such as via a LSAS engine. These computing devices, routers, switches, dedicated hardware/software devices, or other data processing systems, may comprise various hardware elements which are specifically configured, either through hardware configuration, software configuration, or a combination of hardware and software configuration, to implement one or more of the systems/subsystems described herein.

FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described herein with regard to the LSAS engine.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
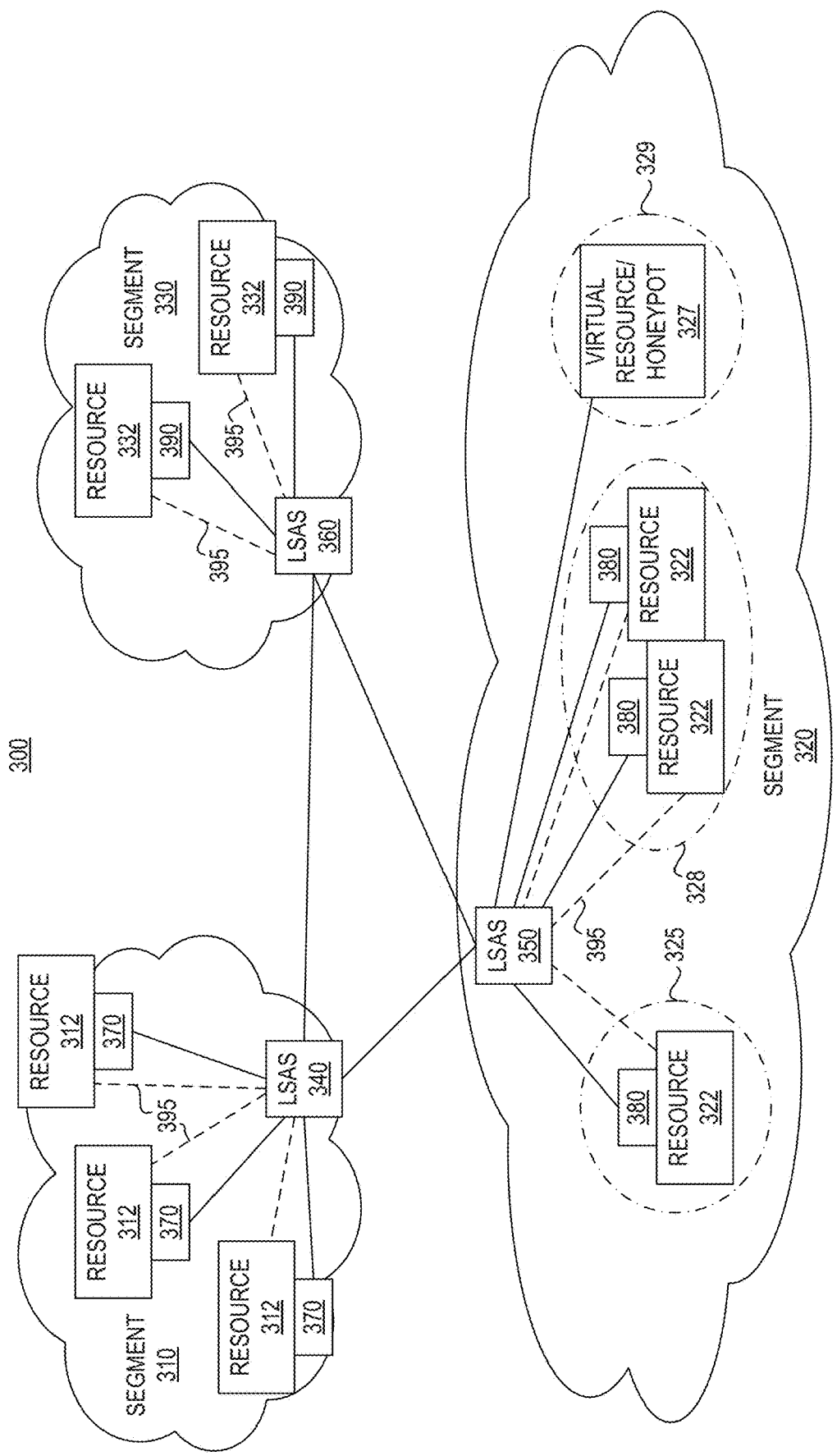
FIG. 3 is an example diagram illustrating a segmented distributed data processing system implementing one or more local segment analysis and security (LSAS) engines in accordance with one illustrative embodiment.

FIG. 3 is an example diagram illustrating a segmented distributed data processing system implementing one or more local segment analysis and security (LSAS) engines in accordance with one illustrative embodiment. In accordance with the illustrative embodiments, a distributed data processing system 300 is provided which may be segmented into an initial set of segments 310, 320, and 330 based on various segmentation characteristics. For example, the distributed computing system 300 may be a cloud computing system in which segmentation of the cloud computing system into segments 310, 320, and 330 is based on geographic regions, organizational departments, virtual segmentation criteria, such as types of cloud computing services provided, types of cloud computing resources provided, virtualized areas of responsibility, or any other suitable real-world or virtualized segmentation characteristics.

As one example, a cloud computing system may be segmented into a first segment 310 for the "Eastern United States", a second segment 320 for the "Central United States Region", and a third segment 330 for the "Western United States." In another example, a cloud computing system may be segmented into "financial services," "backup storage services," "social networking services," "cognitive computing services," and the like. Of course, any combination of segments 310, 320, and 330 based on virtual and/or real-world segmentation characteristics may be utilized, e.g., "financial services for the Eastern United States". In addition, each segment 310, 320, and 330 may be further segmented into sub-segments based on desired configurations such that various levels of segmentation are made possible.

Each segment, and/or sub-segment, of the distributed computing system 300 has associated with it at least one LSAS engine 340, 350, 360 executing on one or more computing devices associated with the segment or sub-segment. The LSAS engine 340, 350, 360 operates in conjunction with software/hardware agents 370-390 associated with the various computing resources of a corresponding segment or sub-segment of the distributed data processing system 300. The agents 370-390 monitor the operation of the computing resources 312, 322, 332 and generate data representing the operational characteristics of the computing resources 312, 322, 332, such as operational statistics, e.g., numbers of errors encountered, throughput, storage capacity utilization, processor utilization, access requests, bandwidth utilization, numbers of detected viruses and their types/sources, or any other operational characteristic or statistical measure. In some illustrative embodiments, the agents 370-390 further comprise mechanisms for identifying and reporting intrusions or violations, such as viruses, unauthorized access attempts, or various types of attacks on the segments or sub-segments of the distributed data processing system, such as may be identified by analyzing traffic patterns to/from the computing resources 312, 322, 332, for example. The agents 370-390 may report such operational characteristics, statistical measures, and indications of intrusions, violations, or attacks to the corresponding LSAS engine 340, 350, 360 for the particular sub-segment and/or segment.

The distributed computing system 300 initially runs without any intrusion, violation or attack alert or notification being generated but with the agents reporting operational characteristics/statistics for the normal operation of their respective computing resources 312, 322, 332 to the corresponding LSAS engine 340, 350, 360. For a particular segment or sub-segment, the LSAS engine, e.g., LSAS engine 340, maintains an inventory of the ongoing data transmissions between the segment resources and other computing devices (e.g., client computing devices), data accesses, bandwidth utilization, and other logging of operations performed by the computing resources 312 of the sub-segment/segment of the distributed data processing system 300, as well as other operational characteristics and statistical measures indicative of a proper operation of the segment of the distributed data processing system 300. This essentially gives a multi-dimensional numerical representation of baseline status indicators that are indicative of a proper operation of the sub-segment or segment 310, 320, 330 of the distributed data processing system 300 against which violations corresponding to attacks or intrusions may be measured. In one illustrative embodiment, as the numerical status indicators increase in value, the indication is that there is a problematic computing environment present and thus, higher values are indicative of higher priority issues corresponding to likely attacks or intrusions that need to be evaluated and rectified.

At some point during operation of the distributed data processing system 300, errors in operation of one or more of the computing resources 312, 322, 332 may be detected, data traffic patterns indicative of intrusions, violations, or attacks, or the like may be detected by one or more agents 370-390 and reported to the corresponding LSAS engine 340-360. For example, as operational characteristics/statistics, traffic pattern operational characteristics/statistics, and the like, are detected and reported by the agents 370-390, this information may be compared to the baseline operational information retained by the corresponding LSAS engine 340-360. If one or more discrepancies are detected and these discrepancies are equal to or above one or more predetermined thresholds, then a determination may be made that the sub-segment or segment 310, 320, 330 is encountering a problematic condition, has encountered a virus, or is under attack. For example, data traffic may be analyzed by the agents 370-390 and/or LSAS engine 340-360 to determine if the data packet sizes, timing, apparent payloads, and the like, are consistent with the information maintained regarding the baseline or normal operation of the computing resources 312, 322, 332 of the sub-segment or segment 310, 320, 330. If these operational characteristics are not consistent, then a potential intrusion, violation, or attack may be identified.

The LSAS engines 340-360 operate to monitor operations and conditions within its own associated segment 310, 320, 330 and communicate with LSAS engines 340-360 associated with other segments 310, 320, 330. Thus, for example, LSAS engine 310 monitors operations and conditions as reported by the agents 370 associated with computing resources 312 in segment 310, whereas LSAS engine 350 monitors operations and conditions as reported by agents 380 associated with computing resources 322 in segment 320. Moreover, the LSAS engines 340, 350, and 360 may communicate with each other to inform each other of the current status of their respective segments 310, 320, 330. The LSAS engines 340, 350, and 360, during a configuration operation, may register with other LSAS engines 340, 350, 360 with which they are communicatively coupled. The configuration information is stored in the LSAS engines 340-360 and provides information about the various segments 310, 320, 330, i.e. the segments associated with the LSAS engines 340-360 themselves and the other segments 310, 320, 330 associated with other LSAS engines 340-360.

As noted above, the monitoring of the segments 310, 320, and 330 by the corresponding LSAS engines 340-360 may comprise interfacing with software/hardware agents 370-390 executing on, or in connection with, various segment computing resources 312, 322, and 332, e.g., computing devices, storage devices, data communication devices (e.g., routers, switches, etc.), and the like, within the LSAS engine's associated localized network or segment 310, 320, 330 in order to collect information about the status and operation of these various resources 312, 322, and 332. Various measures of operation may be calculated and returned by the software/hardware agents 370-390 including bandwidth availability/utilization, processor cycle utilization, storage utilization, throughput, error rates, data traffic pattern information, indications of detected attacks or intrusion attempts, e.g., access requests for accessing resources which are detected to be an attack or attempt to access data without sufficient access rights or permissions, and the like. The software/hardware agents 370-390 may report information about the various hardware and software resources within the localized network.

The LSAS engine, e.g., LSAS engine 350, collects information from the agents 380 in the localized network or segment 320 to capture a representation of a normal operating state of the localized network or segment 320 with regard to a plurality of numerical criteria-based indications of status, thereby providing a multi-axis representation of the normal operating state of the localized network or segment 320.

As attacks or intrusions are attempted on one or more of the resources 322 of the localized network or segment 320, the agents 380 will report information to the LSAS engine 350 indicating a deviation from the normal operating state of the localized network or segment 320. In some illustrative embodiments, numerical criteria-based indications of status in the multi-axis representation of localized network/segment 320 may be reported that deviate from the normal operating state by an amount equal to or greater than a predetermined threshold set in the configuration information of the LSAS engine 350. It should be appreciated that there may be multiple different thresholds established for different types of metrics and for different levels of severity of attack or intrusion so as to trigger appropriate responses by the LSAS engine 350 to perform segregation, dilution, and scaffolding. The LSAS engine 350 and/or agents 380 may utilize any known or later developed mechanism for detecting an attack or intrusion as a basis for reporting such metrics and identifying the existence of a situation in which the segment 320 is the target of an attack or intrusion.

When an attack or intrusion is detected by an agent 380, or the LSAS engine 350 based on metrics reported by the agents 380, an abnormal state may be present which requires a response in accordance with the illustrative embodiments to allow for segmentation, dilution, and scaffolding. With regard to the responsiveness of the LSAS engine 350 to a detected attack or intrusion, the LSAS engine may implement segmentation mechanisms for segmenting the LSAS engine's associated initial segment 320 into sub-segments 325 and 328, for example, to isolate a portion of the segment 320 that is the target of the detected attack from other portions of the segment 320, e.g., isolate sub-segment 325 from sub-segment 328. Moreover, the LSAS engine 350 may operate to isolate the initial segment 320 from other segments 310 and 330 associated with other LSAS engines 340, 360. The isolation, or segmentation, of the initial segment 320 is achieved through inter-segment and/or intra-segment bandwidth throttling at the LSAS engine 350 which sends control signals to the routers/switches (not shown) of the segment 320 to control the throughput of the routers/switches and available bandwidth for various communications to the initial segment 320 and/or portions of the initial segment 320, e.g., sub-segment 325. For example, bandwidth of communications to/from sub-segment 325, which is determined to be the target of an attack in segment 320, across one or more identified intra-segment communication channels, may be throttled so as to reduce the bandwidth of traffic flowing to and from the sub-segment 325, thereby gradually isolating the sub-segment 325 from other portions of segment 320 and other segments 310, 330. As mentioned above, this is similar to the biological response to an attack on a biological system whereby the system responds by beginning to swell the affected biological area and thereby cut off or slow down the spread of the foreign matter into other areas of the biological system.

In addition, the LSAS engine 350 may transmit notifications to other LSAS engines 340 and 360 with which it is registered to inform those LSAS engines 340, 360 of the detected attack/intrusion and the resulting response initiated by the LSAS engine 350. Similarly, the LSAS engine 350 may also receive notifications from other LSAS engines 340, 360 so as to become informed of attacks/intrusions occurring in other segments 310, 330. In addition to throttling bandwidth to/from portions of the segment 320 associated with the LSAS engine 350, the LSAS engine 350, in response to receiving information that another segment, e.g., segment 310, to which it is communicatively coupled, e.g., through an edge device and one or more data networks, is experiencing an attack/intrusion, may throttle bandwidth of data traffic flowing to/from the other segment 310 that is experiencing the attack/intrusion, i.e. throttling the bandwidth of an identified inter-segment communication channel with the other segment 310. As a result, the LSAS engine 350 is able to segment, or isolate, portions of its own segment 320 from other portions of the segment 320 as well as isolate or segment itself from other segments 310, 330 associated with other LSAS engines 340, 360.

The particular amount of bandwidth throttling performed by the LSAS engine 350 may be determined based on different characteristics of the detected attack or intrusion including, for example, the nature of the attack (e.g., type of virus or access request pattern detected), the origin of the attack (e.g., as may be obtained from a database of information regarding various attacks, such as a virus definition data structure or the like), a determined degree of severity of the attack (e.g., a representation of the amount of damage that the attack will cause if successful), and the like. As the severity of the attacks/intrusions increase, the level of throttling may be increased so as to further segment or isolate the affected areas of the computing system. Thus, the LSAS engine 350 may maintain a history of the status of the segment 320 associated with the LSAS engine 350 and the other segments 310, 330 associated with the other registered LSAS engines 340, 360. The trend in status of the segment 320 and other registered segments 310, 330 may be evaluated periodically to determine whether the throttling of the bandwidth should be increased or reduced. Corresponding control signals are sent to the computing devices, routers, switches, and other data traffic routing mechanisms to facilitate the increase/reduction in bandwidth to the affected segments 310, 320, 330, or portions of segments, e.g., sub-segments 325, 328.

As discussed previously, the LSAS engine 350 may also, in response to a detected attack or intrusion, perform a dilution response to dilute the traffic that is part of the attack and slow the ability of the attack to affect the segment 320 and spread to other segments 310, 330 of the system 300. The dilution response may take the form of a deliberate introduction of innocuous messages (data packets) that dilute the amount of attack or intrusion based messages (data packets) processed by the segment 320, thereby slowing down the ability of the attacker. The introduction of innocuous messages (data packets) reduces the available bandwidth to attack or intrusion messages and thus, dilutes the attack or intrusion messages. The LSAS engine 350 may generate such dilution data packets or messages that are processed by the segment resources 322 in a normal manner but which do not affect the state of the segment resources 322 other than to dilute the attack or intrusion traffic.

The dilution response may also take the form of sandboxing and/or utilizing a honeypot mechanism. As shown in FIG. 3, the segment 320 may comprise a virtual sub-segment 329 representing a sandbox or honeypot with virtual resource processes/honeypot data structures 327. The LSAS 350 may redirect suspect data packets or messages such that the suspect traffic is directed to the sandbox/honeypot 329 along an alternative communication channel associated with the sandbox/honeypot 329. Since the resource processes are virtualized, and/or the honeypot data representing false but enticing data, does not affect the operation of the other actual resources of the segment 320, the attack is essentially quarantined to the virtual sub-segment 329 while corrective action is taken to thwart the attack.

A graduated approach to performing the dilution response may be utilized by the LSAS engine 350 in a similar manner to the graduated mechanisms for throttling the bandwidth both within and between segments 310, 320, 330. The LSAS engine 350 may begin with dilution of the traffic to/from the affected sub-segment 325 or the segment 320 as a whole by introducing innocuous data packets or messages into the data traffic. As the LSAS engine 350 continues to monitor the status of its own segment 320 and other registered segments 310, 330, if the characteristics of the attack indicate an increase in the severity of the attack, the dilution may be performed by switching the data communication traffic to a sandbox traffic channel associated with the virtual sub-segment 329, where the data packets or messages are handled by a defined set of sandbox processes 327 that do not affect the state of the other segment resources 322. Alternatively, the traffic may be redirected to a honeypot data set or set of processes 327 that comprise falsified data or virtualized processes that do not affect the remainder of the segment 320 and do not provide valid data.

As discussed above, one of the aspects of the LSAS engine 340-360 is the ability to base the determination as to whether to begin "swelling" type responses to a detected attack or intrusion based not only upon its own segment's reported status, but also the statuses of the other segments associated with other LSAS engines. Thus, the LSAS engine 340-360 analyzes an internal condition, e.g., its own associated segment, and a condition of other parts of the data processing system, e.g., other segments registered with the LSAS engine 340-360. In some illustrative embodiments, the other segments and corresponding LSAS engines 340-360 whose states are analyzed may be specified in configuration information for the LSAS engine 340-360 and may, or may not, encompass all of the other segments of the data processing system. That is, in a large organization having a correspondingly large distributed data processing system, an LSAS engine 340-360 may only analyze its own segment's status and that of "neighboring" segments. A "neighbor" segment is one that is geographically, organizationally, or computer system topologically defined as being adjacent or directly connected to the current LSAS engine and its associated segment. Thus, for example, within a geographically distributed data processing system, a segment associated with India may not be a "neighboring" segment to a segment associated with the Eastern United States, but may be a "neighboring" segment to a segment associated with South East Asia. Whether a segment is "neighboring" or not of another segment will be dependent upon the particular configuration of the data processing system.

Another aspect of the LSAS engines is the ability to gradually intensify the "swelling" response in response to an increase severity of the attack or intrusion on the LSAS engine's associated segment and/or other segments that may directly affect the LSAS engine's associated segment, e.g., "neighboring" segments. The LSAS engines 340-360 may be configured with logic for defining the manner and conditions under which the segmentation and dilution responses are performed and the responses are increased. Thus, for example, various thresholds or levels of severity of attacks, types of attacks, sources of attacks, and other attack characteristics, may be defined with corresponding responses being associated with these thresholds. For example, a first threshold may be established for a low severity attack within the LSAS engine's own segment that indicates that a first level of segmentation response should be initiated that narrows the bandwidth available to the communication channels associated with the affected segment or sub-segment. A second threshold may be established for a low severity attack within the segment associated with the LSAS engine coupled with another low severity attack in a "neighboring" segment which causes a narrowing of the intra-segment bandwidth to the affected sub-segment and a narrowing of the inter-segment bandwidth with the communication channels to the other affected segment. Still further, a third threshold may be established based on the source and type of the attack, e.g., if the attack is a denial of service attack, and the attack is known to originate from a geographic location of interest, then a more substantial narrowing of the bandwidth of inter-segment communication channels may be performed coupled with a dilution response on inter-segment communication channels. Any combination of attack characteristics may be paired with a corresponding threshold and one or more "swelling" responses and intensities of responses without departing from the spirit and scope of the illustrative embodiments.

Whether using a segmentation response, dilution response, or both, the mechanisms of the LSAS engines 340-360 may further provide mechanisms for providing a scaffolding response, as previously noted above. The scaffolding response provides mechanisms for providing post-event countermeasures to regain normal operation of the segment, sub-segment, or computing system. These mechanisms may include an alternate communication channel 395 that is maintained in reserve for use in case an attack or intrusion is detected. In the case of a detected attack or intrusion, and the initiation of the segmentation and/or dilution responses, the LSAS engine 350 may enable the alternate communication channel 395 through which control messages may be transmitted from the LSAS engine 350, and other recovery systems (not shown), to access segment resources 322 and regain normal operation of the resources 322. For example, in the case of a denial of service attack, control messages may be sent across this alternate communication channel 395 to cause the resource 322 to reboot or otherwise clear out its queues of data packets or messages and configure the resource 322 to block or otherwise avoid the denial of service attack.

Figure 4:
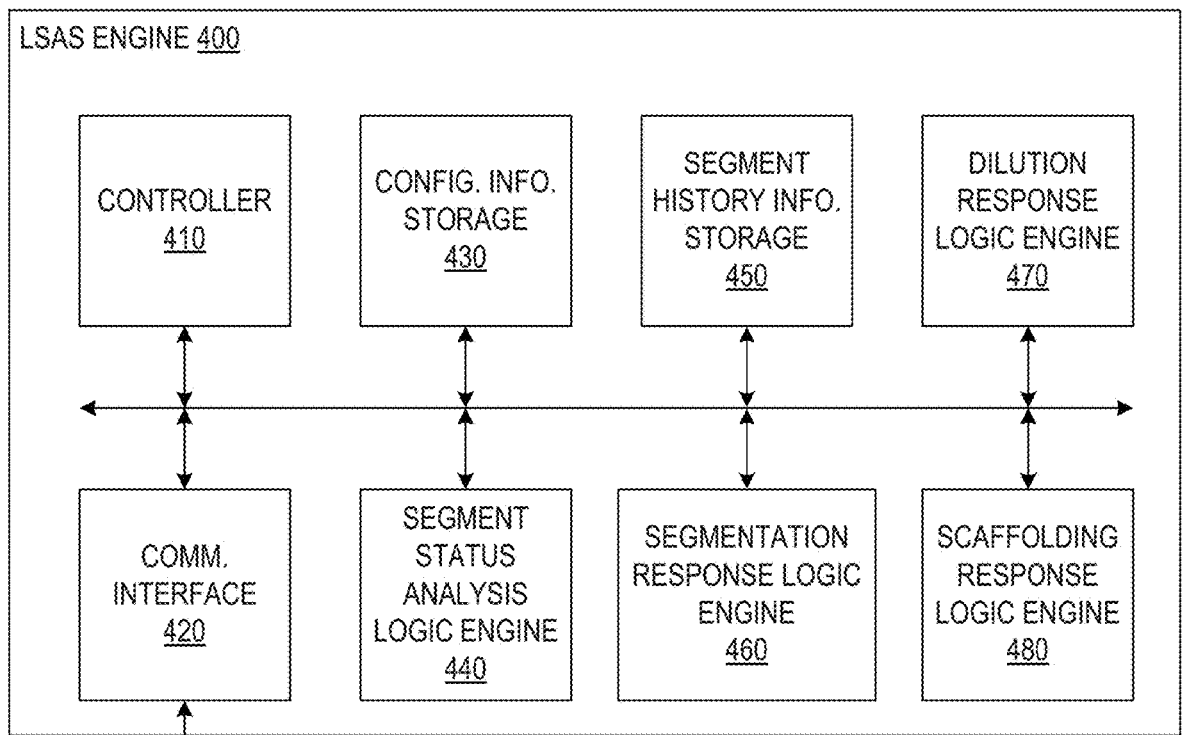
FIG. 4 is an example block diagram of a local segment analysis and security (LSAS) engine in accordance with one illustrative embodiment.

FIG. 4 is an example block diagram of a local segment analysis and security (LSAS) engine in accordance with one illustrative embodiment. As shown in FIG. 4, the LSAS engine 400 comprises a controller 410, a communications interface 420, configuration information storage 430, segment status analysis logic engine 440, segment history information storage 450, segmentation response logic engine 460, dilution response logic engine 470, and scaffolding response logic engine 480. The controller 410 controls the overall operation of the LSAS engine 400 and orchestrates the operation of the other elements 420-480 of the LSAS engine 400 so as to achieve the desired results for analyzing the status of one or more segments of a data processing system, detecting statuses indicative of an attack or intrusion on a segment or sub-segment of the data processing system, and providing a "swelling" response to the detected attack or intrusion by performing a segmentation, dilution, and/or scaffolding response. Any operations described herein that are not described as being performed by one or more of the other elements 420-480 are performed by the controller 410.

The communications interface 420 provides a data communication pathway through which the LSAS engine 400 receives data and information from agents deployed in the LSAS engine's associated segment, sub-segment, or the like, and further receives data from other LSAS engines 400. In addition, the communications interface 420 provides a data communication pathway through which the LSAS engine 400 is able to send control signals, data packets, and/or messages to other elements of the associated segment to facilitate the performance of an appropriate "swelling" response to a detected attack or intrusion. For example, the LSAS engine 400 may send control messages to routers, switches, or other data traffic flow control mechanisms in the segment to cause the bandwidth of channels associated with a sub-segment that is detected as being the target of an attack, to become narrower by reducing the available bandwidth and/or introducing innocuous messages to dilute the traffic flowing through the channels. As another example, the communication interface 420 may further comprise one or more reserved channels used by the LSAS engine to send control messages to facilitate regaining control of segment resources in the event that an attack on those resources is detected.

Configuration information storage 430 stores the configuration information, neighboring segment data structures, threshold/response mapping data structures, defined response rule sets, and any other configuration information that provides the basis for configuring the LSAS engine 400 to operate in a manner desired by the particular implementation. In particular, the configuration information storage 430 comprises data structures that specify the other LSAS engines and their corresponding segments that are considered to be "neighbors" to the current segment associated with the current LSAS engine 400. This may be a designation of all other segments or only a subset of the segments of the data processing system. In this way, when status messages are sent to the LSAS engine 400 from other LSAS engines and received via the communication interface 420, the controller 410 can determine if the status messages are ones of interest to the LSAS engine 400 as only those associated with neighbor segments need to be processed and the information stored in the segment history information storage 450.

In addition, the configuration information storage 430 stores data structures defining the thresholds for attacks/intrusions and the corresponding "swelling" response to initiate in response to the conditions of these thresholds being met. The thresholds may be specified in terms of numeric segment status metrics (e.g., bandwidth utilization, processor utilization, storage utilization, error rates, etc.) or other characteristics of an attack including, but not limited to, a type of attack (e.g., denial of service type attack), a source of an attack (e.g., a particular geographical region as a source), a determined severity of the effects of the attack (e.g., loss of service or breach of access controls), and the like. The thresholds are preferably paired with a corresponding response that indicates the aspects of a "swelling" response to be employed and the intensity of these aspects of the response, e.g., segment the affected sub-segment by narrowing the bandwidth by 30% and diluting the data traffic by 25% through the injection of innocuous messages. In general, this threshold and response information defines the severity of the attack and the severity of the "swelling" response to be employed. This information may be updated in a manner similar to virus definition updates in which information about existing or new threats may be updated on a periodic basis using automated and/or manual processes.

The segment status analysis logic engine 440 operates to process segment status information obtained from agents deployed in the LSAS engine's associated segment or sub-segment as well as status information for other segments or sub-segments associated with other LSAS engines, as received via the communications interface 420. The segment status analysis logic engine 440 may receive segment status metric information from the agents deployed in association with computing resources of the segment, such as bandwidth utilization, processor utilization, numbers of detected viruses, error rates, traffic pattern information, and the like. The segment status analysis logic engine 440 may then analyze this segment status metric information and evaluate it against a baseline normal operation representation of the segment, as may be stored in the segment history information storage 450, to determine whether an attack or intrusion into the segment, or a sub-segment, is detected as well as the characteristics of the attack or intrusion including the type of attack, source of the attack, and severity of the attack. In addition, the segment status analysis logic engine 440 may analyze information received from other LSAS engines to determine the conditions of neighboring segments or sub-segments, trends in the status of neighboring segments or sub-segments (e.g., getting better (less severe conditions) or getting worse (more sever conditions)), and how these other statuses may affect the status of the LSAS engine's own segment. This may include intensifying the "swelling" response by performing a segmentation or dilution response on communication channels associated with these other segments or sub-segments. The particular thresholds, mappings of status with responses, and the like, may be done by the segment status analysis logic engine 440 utilizing the configuration information stored in the configuration information storage 430.

The segment history information storage 450 stores a baseline set of status metrics for the segment or sub-segment associated with the LSAS engine 400 which provides a multi-dimensional or multi-axis representation of a normal operational status of the segment or sub-segment. In addition, the segment history information storage 450 stores a moving window of historical status information for neighboring segments or sub-segments as reported from other LSAS engines. The moving window essentially keeps status information for other segments/sub-segments that is within a predetermined amount of time of the current time. This historical information allows for trend analysis to be performed by the segment status analysis logic 440. In some illustrative embodiments, a moving window of historical information may also be maintained for the segment/sub-segment associated with the LSAS engine 400 so as to allow similar trend analysis to be performed with regard to the segment/sub-segment associated with the LSAS engine 400. As noted above, the results of the processing of this historical information may be combined with current status information for the segment/sub-segment and neighboring segments/sub-segments to determine what responses to trigger.

The segmentation response logic engine 460 provides the logic for implementing segmentation responses in response to triggering of the segmentation response by the results of the analysis performed by the segment status analysis logic 440. As noted above, the segmentation response may comprise bandwidth narrowing both from an intra-segment and inter-segment viewpoint. Similarly, the dilution response logic engine 470 provides the logic for implementing dilution responses in response to triggering of the segmentation response by the results of the analysis performed by the segment status analysis logic 440. As noted above, the dilution response may comprise injection of innocuous messages to dilute the attack traffic along channels of affected segments or sub-segments, as well as sandboxing or honey potting as an option. Each of these response types may be performed in a graduated manner based on the determined level of severity of the attack or trends in severity of the attacks.

The scaffolding response logic engine 480 provides the logic for implementing the scaffolding response in response to triggering by the segment status analysis logic 440. As attack severity increases and thresholds are met, some of the responses may be to initiate recovery operations to recover control of particular segment resources. As a result, the scaffolding response logic engine 480 will be triggered to initiate control communications across alternative or reserve communication channels with the segment resources to cause the corresponding segment resources to reboot, or otherwise recover to a state where they will not be experiencing the negative effects of the attack.

Figure 5:
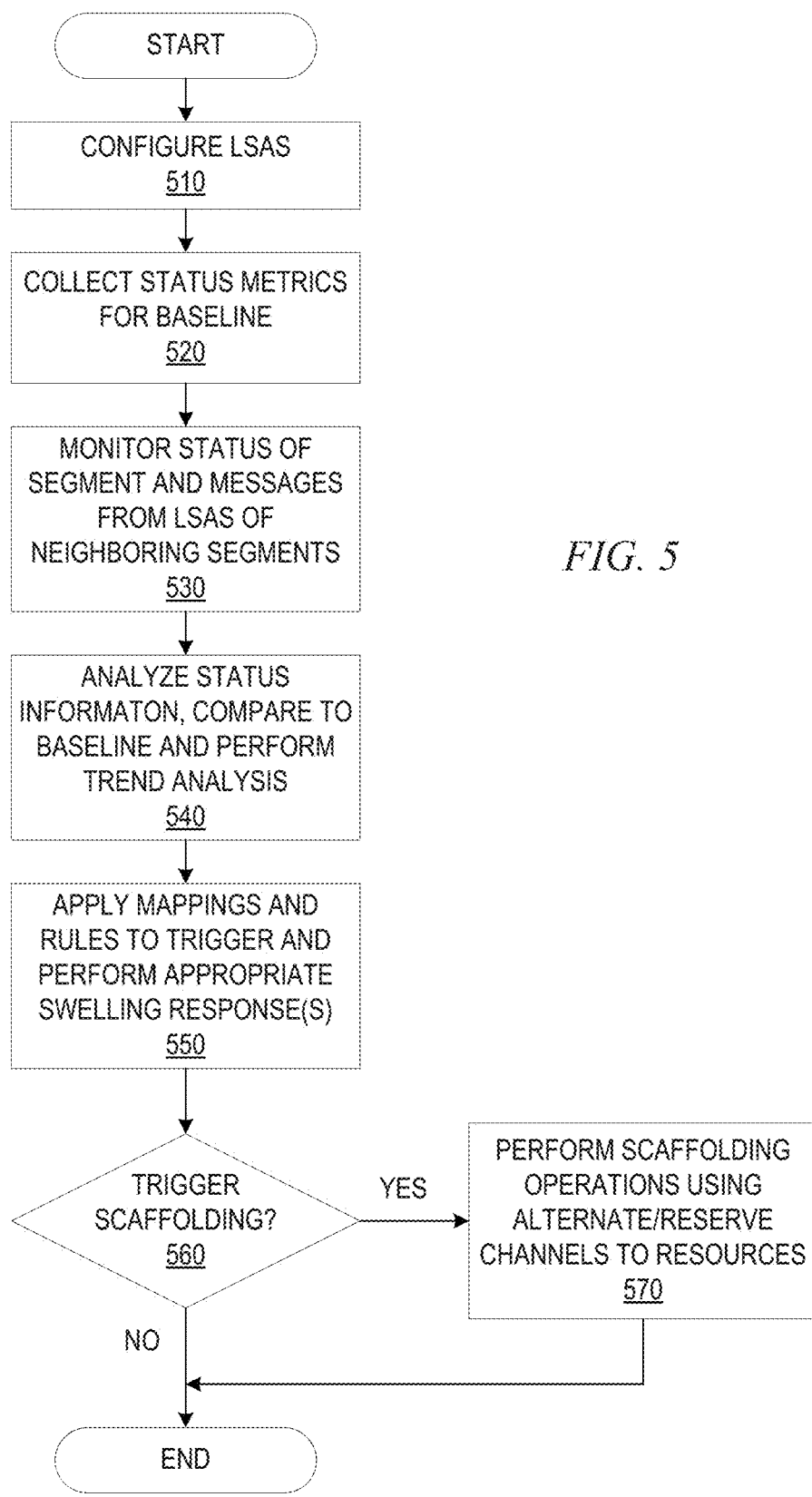
FIG. 5 is a flowchart outlining an example operation of a LSAS engine in accordance with one illustrative embodiment.

FIG. 5 is a flowchart outlining an example operation of a LSAS engine in accordance with one illustrative embodiment. As shown in FIG. 5, the operation starts with the configuring of the LSAS engine with regard to segment status conditions, thresholds, corresponding responses, mapping data structures for mapping segment status conditions and thresholds to corresponding responses, rules, and the like, as well as information regarding neighboring segments (step 510). The LSAS engine operates in conjunction with agents deployed in association with segment resources to collect multi-dimensional or multi-axis segment status metrics indicative of a baseline or normal operational state of the segment (step 520). The status of the segment associated with the LSAS engine and status messages from other LSAS engines associated with neighboring segments is monitored (step 530). The status information is analyzed and compared to the baseline operational state of the segment, trend analysis is performed (step 540), and the mapping data structures and rules are applied to the results of the analysis to trigger any applicable swelling response (step 550). The swelling response may be to implement a segmentation response and/or dilution response as previously described above, or to intensify a previously implemented response. In some cases, the graduated response may involve implementing additional responses based on the results of the analysis indicating a worsening trend, e.g., increasing the segmentation response to reduce bandwidth while also implementing a sandboxing dilution response.

A determination is made, based on the results of the analysis and application of mapping data structures and rules, whether a scaffolding response should be initiated to recover control of an affected segment's resources (step 560). If not, the operation terminates. If so, the operation initiates a scaffolding response by initiating control communications to segment resources across reserved or alternative communication channels (step 570). The operation then terminates. It should be appreciated that while FIG. 5 shows the operation terminating, the operation may be repeated on a periodic or continuous basis so as to repeatedly determine an appropriate swelling response or increase/decrease in the intensity of the swelling response as changes in the segment and neighboring segment statuses change dynamically.

Thus, the illustrative embodiments provide mechanisms for implementing security responses to detected attacks or intrusions that model a biological system's response to a foreign intrusion into the biological system. In particular, the illustrative embodiments model the "swelling" response of a biological system by providing mechanisms for implementing segmentation, dilution, and scaffolding of the affected areas of the data processing system in an analogous manner to that of a swelling reaction by a biological system. Thus, the efficiencies of a biological system for dealing with foreign intrusion or attacks are made possible in a data processing system.

As mentioned above, one type of distributed data processing system in which the various aspects of the illustrative embodiments may be implemented is a cloud computing system. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
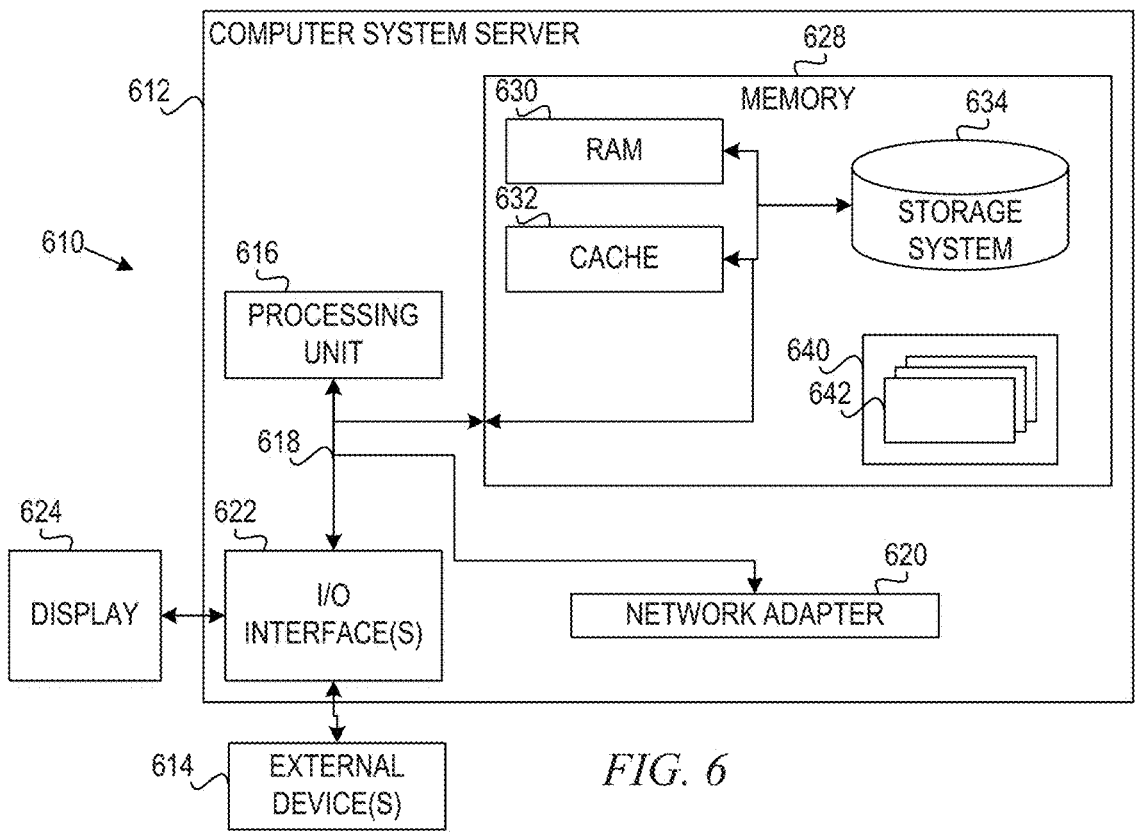
FIG. 6 depicts a cloud computing node according to an illustrative embodiment.

Referring now to FIG. 6, a schematic of an example of a cloud computing node is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
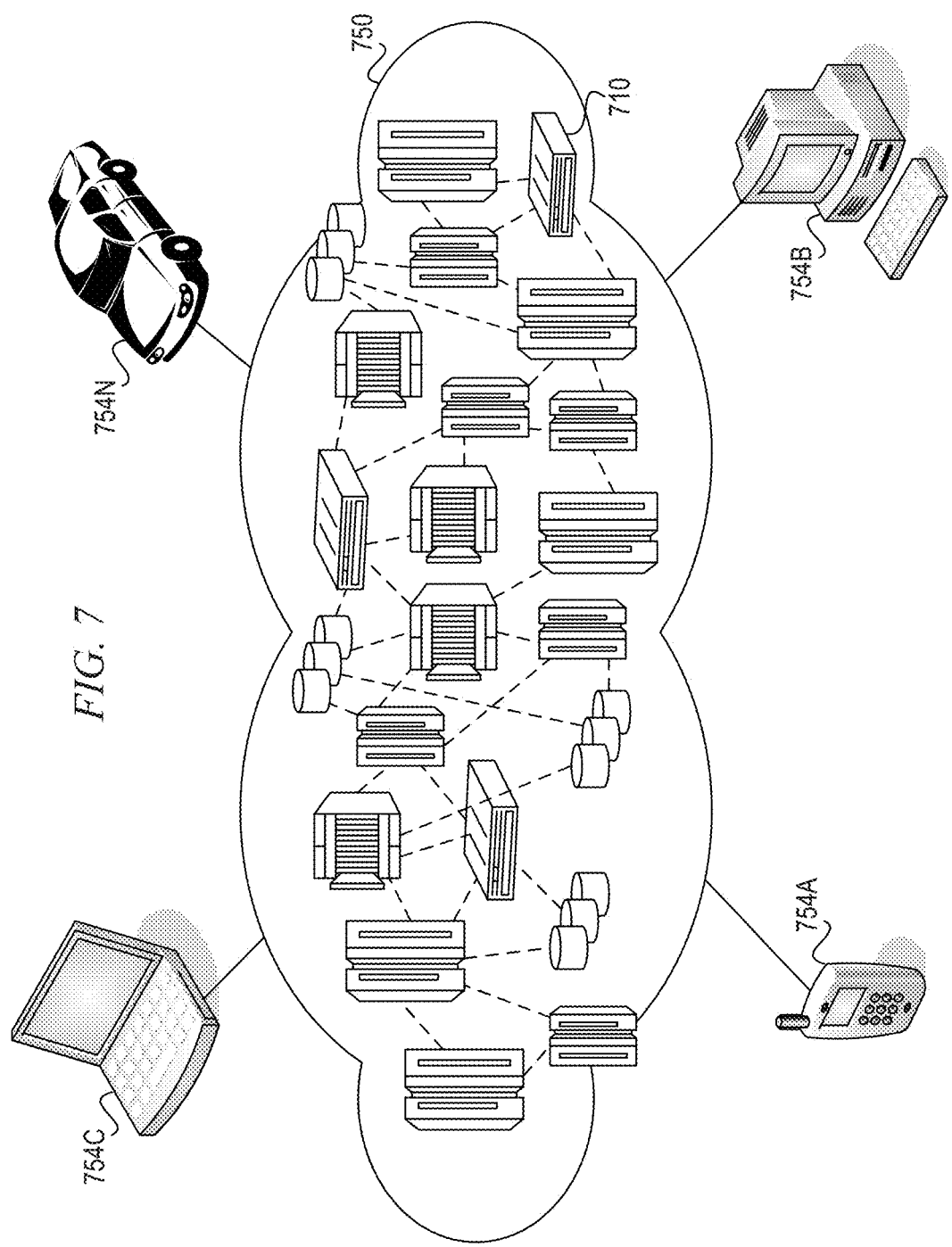
FIG. 7 depicts a cloud computing environment according an illustrative embodiment.

Referring now to FIG. 7, an illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 10 and cloud computing environment 750 can communicate with any type of computerized device over any type of network and/or network addressable connection (e.g., using a web browser).

Figure 8:
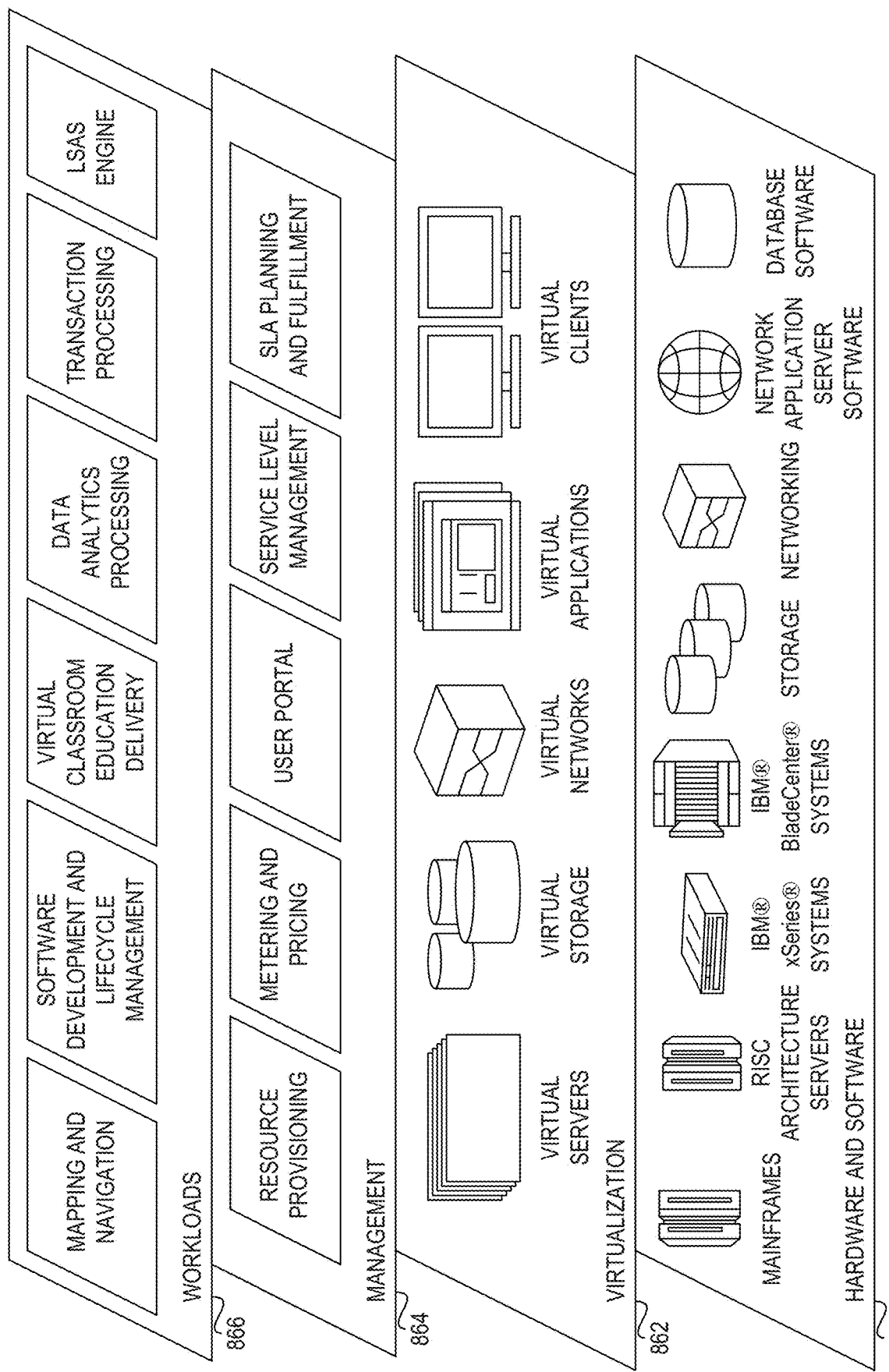
FIG. 8 depicts abstraction model layers according to an illustrative embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software (IBM, zSeries, pSeries, xSeries, BladeCenter, Web Sphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the LSAS engine mechanism previously described above for handling segment analysis and security functions modeled in accordance with the "swelling" response of biological systems.

The above description sets forth various illustrative embodiments in which LSAS based mechanism may be implemented for addressing detected attacks or intrusions of a computing system or distributed data processing system environment by providing a simulated biological system response in a computer environment. The particular simulated biological system response is a "swelling" response which provides mechanisms that may implement automatic and dynamically changing reactions to the detected attacks or intrusions with regard to segmentation, dilution, and/or scaffolding.

In further illustrative embodiments, the mechanisms are augmented to be implemented with, or in conjunction with, a cognitive computing system which may provide cognitive analysis and functionality for determining attacks or intrusions that are currently of concern, the nature of such attacks, origin of such attacks, patterns of activity for identifying potential attacks/intrusions, correlating attacks or intrusions with severity measures, determining biological responses to be applied to address such attacks or intrusions, as well as evaluating whether responses to identified potential attacks/intrusions are working or not, and the like. The cognitive computing system may perform cognitive analysis of natural language content from one or more corpora of natural language content, to generate knowledge upon which the LSAS mechanisms of the illustrative embodiment may operate, or upon which a mechanism that controls such LSAS mechanisms may operate, to determine how to configure, coordinate, or otherwise instruct the LSAS mechanisms with regard to their operation in responding to detected attacks or intrusions.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems using a Question Answering pipeline or system (QA system) and/or process requests which may or may not be posed as natural language questions, e.g., a request processing pipeline or system implementing similar analysis, evaluation and ranking mechanisms as that of a QA pipeline or system. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

In a similar manner, in accordance with the mechanisms of one or more illustrative embodiments, the natural language processing, evidence scoring, and ranking mechanisms of the a QA pipeline/system, or request processing pipeline/system may be applied to documentation of a corpus or corpora to identify instances of natural language content referencing attacks or intrusions documented by various sources. For example, the corpus or corpora may represent electronic documents published via websites, natural language content exchanged between users of social networking websites, content of technical websites, content of blogs or newsfeeds, or content associated with any other electronic mechanism for making content available via an electronic means, e.g., via one or more computing devices and one or more data networks.

In accordance with the illustrative embodiments, the corpus or corpora are directed to domains associated with content that describe attacks or intrusions into computing systems. Thus, the sources of content of a corpus or corpora used by the mechanisms of the illustrative embodiments may be a specifically selected set of sources that are known to provide reliable content about computer attacks or intrusion. In other illustrative embodiments, the sources may not be as strictly selected and measures of reliability of different sources may be used along with other factors when evaluating information coming from those sources.

The content in the corpus or corpora may indicate various characteristics of attacks/intrusions (hereafter considered to be an attack for ease of explanation) including, but not limited to, the name of the attack, the believed origin of the attack, the nature of the attack indicating the type of attack, any recognizable patterns of data activity or computing system activity that indicate the potential presence of such an attack, severity of the attack, responses to the attack performed by others, successfulness of such responses, response recommendations, or the like. It should be appreciated that these various characteristics may not all be present in the same document or portion of content of a corpus (hereafter assumed to be a document for ease of explanation) and may be distributed across documents of one or more corpora. Thus, the cognitive computing system may accumulate characteristics of an attack from across multiple documents of a corpus and build an attack profile from this accumulation of attack characteristics. Moreover, in building this profile, the cognitive computing system may utilize evidence scoring to determine the characteristics having the relatively largest amount of supporting evidence and rank those characteristics relative to one another as indicative of the attack. This may be done in addition to ranking evidence of the attack as a whole, i.e. determining a measure of evidence that such an attack is even present or existing and should be guarded against.

The evaluation of the evidential support for the attack as a whole, as well as the individual characteristics of the attack, may generate evidential scores for the attack and individual characteristics which can then be compared against one or more threshold evidence score values. If the evidential support for the attack and/or characteristic meets or exceeds the requirement defined by the one or more threshold evidence score values, then the attack and/or characteristic is maintained as an element of an attack profile for the attack. If the evidential support is lacking, i.e. the evidence score for the attack or characteristic does not meet or exceed the requirement of the threshold, then it may be discarded as not being credible. This may result in an entire attack profile being discarded or not being generated in the case where there is insufficient evidence of the actual existence of such an attack.

Based on the built attack profile, the cognitive computing system may provide configuration information to controllers of the LSAS engines to configure them to make determinations as to how to detect such an attack/intrusion and how to respond to such an attack/intrusion when it is detected by an LSAS engine, for example. Thus, the accumulated characteristics in the attack profile may indicate the nature of an attack/intrusion which allows the LSAS engine to determine an appropriate segmentation, dilution, and/or scaffolding response as well as a degree of throttling of the segmentation to be applied, the type of dilution to apply, and if, when, and how to apply scaffolding responses.

For example, various documents may present information in natural language content that indicates an attack as well as characteristics including a nature of the attack, e.g., denial of service attack, port scanning, spoofing attack, "ping of death" attack, unauthorized access attempt, Trojan attack, phishing attacks, traveling worm attacks, or any other type of passive or active attack, countermeasures for responding to such attacks, severity of the attack, source of the attack, and the like. It should be appreciated that such information may not be presented explicitly but may be extracted from the natural language content via cognitive analysis, e.g., identifying key terms/phrases and correlating those key terms/phrases with concepts and acquired knowledge using a cognitive computing system. The cognitive computing system may be specifically configured with dictionaries, synonym data structures, and other resources directed to the domain of computing system attacks/intrusions.

Moreover, the natural language content may provide information about the way in which such attacks may be detected, e.g., the "ABC" attack is a denial of service attack that is characterized by a pattern of data packets having particular types of payloads sent a particular frequency. This information may be used to generate an attack profile that indicates the identity of the attack, the type of attack (denial of service), and the detection pattern for the attack (payload type and frequency of packets), assuming sufficient evidence is present to support the creation of such an attack profile and include such characteristics in the attack profile. Other natural language content may also comment on the "ABC" attack and may indicate other characteristics of the attack, such as characteristics indicating at particular times of day the attack occurs, particular computing system sources from which the attack most often is initiated (e.g., websites geographically located in countries known to orchestrate frequent cyberattacks), mode of distribution, e.g., email, website cookies, user click-throughs, etc., and other characteristics. These characteristics may be added to the attack profile assuming sufficient evidence is present to warrant the addition of these characteristics. Other content in the same or different corpus may indicate a response to the "ABC" attack that was tried and the results that were obtained. This information may indicate that the response worked well or did not work well and may be further information that can be added to the attack profile to indicate whether or not to utilize the response in future detected instances of the attack which may be detected by LSAS engines. In this way, an attack profile may be built from information extracted via natural language processing of content in one or more corpora.

The cognitive computing system, which may be implemented on a server computing system, such as server 610 in FIG. 6, for example, may provide the attack profiles built using the cognitive operations of the cognitive computing system to the LSAS engine(s) of segment(s) of a computing environment. That is, in embodiments where the cognitive computing system operates as part of a centralized controller system for the LSAS engine(s), the attack profiles built by the cognitive computing systems may be distributed to the LSAS engine(s) along with control signals or messages indicating that the LSAS engine(s) should configure themselves to implement the new attack profiles being sent by the cognitive computing system. In other embodiments, where the cognitive computing system is implemented on a same computing system as the LSAS engine, or as part of the LSAS engine, the attack profiles may be automatically integrated into the LSAS engine and the LSAS engine configured to implement the newly integrated attack profiles.

Based on the integration of the attack profile in the LSAS engine, such as part of the configuration information storage 430 in FIG. 4, for example, the segment status analysis logic engine 440 may utilize the characteristics in the attack profile directed to detecting and identifying an attack to analyze the segment status in the manner previously discussed above. That is, the segment status analysis logic engine 440 may compare the segment metrics against the baseline information stored in the segment history information storage 450 as discussed above to determine a discrepancy between the current segment metrics and the baseline. This discrepancy may then be compared, by the segment status analysis logic engine 440, against various detection characteristics of attack profiles to identify one or more attack profiles for attacks that may be potentially matched by the discrepancy.

For those attack profiles that potentially match the pattern of metrics or the discrepancies from the baseline, corresponding information about the attack from the attack profile may be retrieved and used by the other logic of the LSAS engine, e.g., segmentation response logic engine 460, dilution response logic engine 470, and/or scaffolding response logic engine 480, to determine how to respond to the detected attack. This may involve analyzing the attack profile characteristics to determine a severity of the attack, the type of attack, and other characteristics that may indicate a type and level of response to apply to the computing system resources of the segment. For example, through analysis of the attack profile information, it may be determined that a different level of initial throttling of bandwidth should be utilized by the segmentation response logic engine 460 than would otherwise be utilized because of the perceived severity of the attack, the nature of the way in which the attack is spread through computer systems, the source of such attacks, e.g., within or outside the segment, and the like.

Moreover, it may be determined that throttling should be applied to particular connections with other segments, such as based on a determined origin of the attack, e.g., the attack originates from computing systems in a particular country and thus, any connections between edge devices of the segment and segments associated with that country may be throttled while other edge device connections may not necessarily be throttled or may be throttled at a lower severity. As another example, it may be determined from the attack profile in the configuration information storage 430 that others have responded to the attack by using X level of throttling and sandboxing, or honeypotting, and the segmentation response logic engine 460 and dilution response logic engine 470 may operate on such information to implement similar responses when the same attack is detected in association with a segment or sub-segment that they are configured to protect. Various determinations of how to customize the response to the attack based on the attack profile may be performed by the various logic engines 460-480 without departing from the spirit and scope of the illustrative embodiments.

Thus, in some illustrative embodiments, a cognitive computing system may be utilized to build an attack profile that may be used to configure one or more LSAS engines to detect particular attacks and determine an appropriate response to the detected attack utilizing the biological response based mechanisms of the LSAS engines. In other aspects of the illustrative embodiments, the evaluation of attack information in natural language content of one or more corpora, by the cognitive computing system, may further be utilized to gauge the biological response from the LSAS engines to determine the effectiveness of such a biological response. That is, the LSAS engines may implement their own determined responses to a perceived attack to their segments or segments to which they are coupled and information about the response may be sent to the cognitive computing system. The cognitive computing system may then utilize this input as a type of input question or request that requests that the cognitive computing system evaluate the appropriateness of the LSAS engine's determined response.

In a similar manner as described above, the cognitive computing system may perform natural language processing, evidence analysis and scoring, ranking, and the like, to determine whether information in content of a corpus or corpora indicates that the response instituted by the LSAS engine has sufficient evidence to indicate that it is a proper response to the detected attack. Moreover, if the evidence is not sufficient, an alternative response may be identified and returned to the LSAS engine for implementation based on the processing performed by the cognitive computing system. This information may be used to train the LSAS engine logic to implement different types of responses to future detections of similar attacks, e.g., attacks where the metrics are determined to be similar to the present attack. This learning may be performed via a machine learning process, for example, so as to adjust parameters implemented by the logic engines 460-480. For example, based on the evaluation of the appropriateness of the response determined by the segmentation response logic engine 460 relative to information found through cognitive processing of content from one or more corpora via the cognitive computing system, a determination may be made to adjust the parameters used by the segmentation response logic engine 460 for determining an amount of throttling for attacks of the type currently experienced such that more initial throttling is implemented than otherwise would have been. Moreover, the dilution response logic engine 470 may have its parameters modified such that one type of dilution is more favored over another based on the cognitive evaluation of the LSAS engine's response, e.g., the content of the corpora indicates that honeypotting is more effective against this attack or this type of attack than sandboxing.

Thus, in these alternative illustrative embodiments, rather than dictating to the LSAS engines the way in which they should determine how to respond to a perceived attack by specifically generating attack profiles and deploying them to the LSAS engines as configuration information, the cognitive computing system serves as a machine learning tool that provides feedback as to the appropriateness of a response generated by the LSAS engines and provides corrective information to the LSAS engines. This corrective information may be utilized through machine learning processes to modify operational parameters of the logic engines 460-480 of the LSAS engine so as to adjust the way in which these engines determine how to respond to future perceived attacks.

In still other aspects of the illustrative embodiments, the experience data from the LSAS engines may be provided back to the cognitive system for use in determining what biological response mechanisms work better than others when addressing certain attacks. That is, just as the cognitive computing system may be utilized to help train the logic of the LSAS engine as noted above, the responses determined by the LSAS engine logic may also be provided to the cognitive computing system as additional corpus or corpora information upon which the cognitive computing system may operate for future requests to provide attack profiles or evaluate the operation of a LSAS engine and provide corrective information for machine learning. That is, the corpus or corpora upon which the cognitive computing system may be automatically expanded to include information from the LSAS engines indicating the detected attacks and the responsive measures taken to perform a biological "swelling" response to the detected attack. Thus, additional information is added to the corpus or corpora indicating the characteristics of the perceived attack and the characteristics of the response that was instituted by the LSAS engine. The cognitive computing system may then utilize this information to either generate, or modify existing, attack profiles, evaluate LSAS engine responses, or the like.

Figure 9:
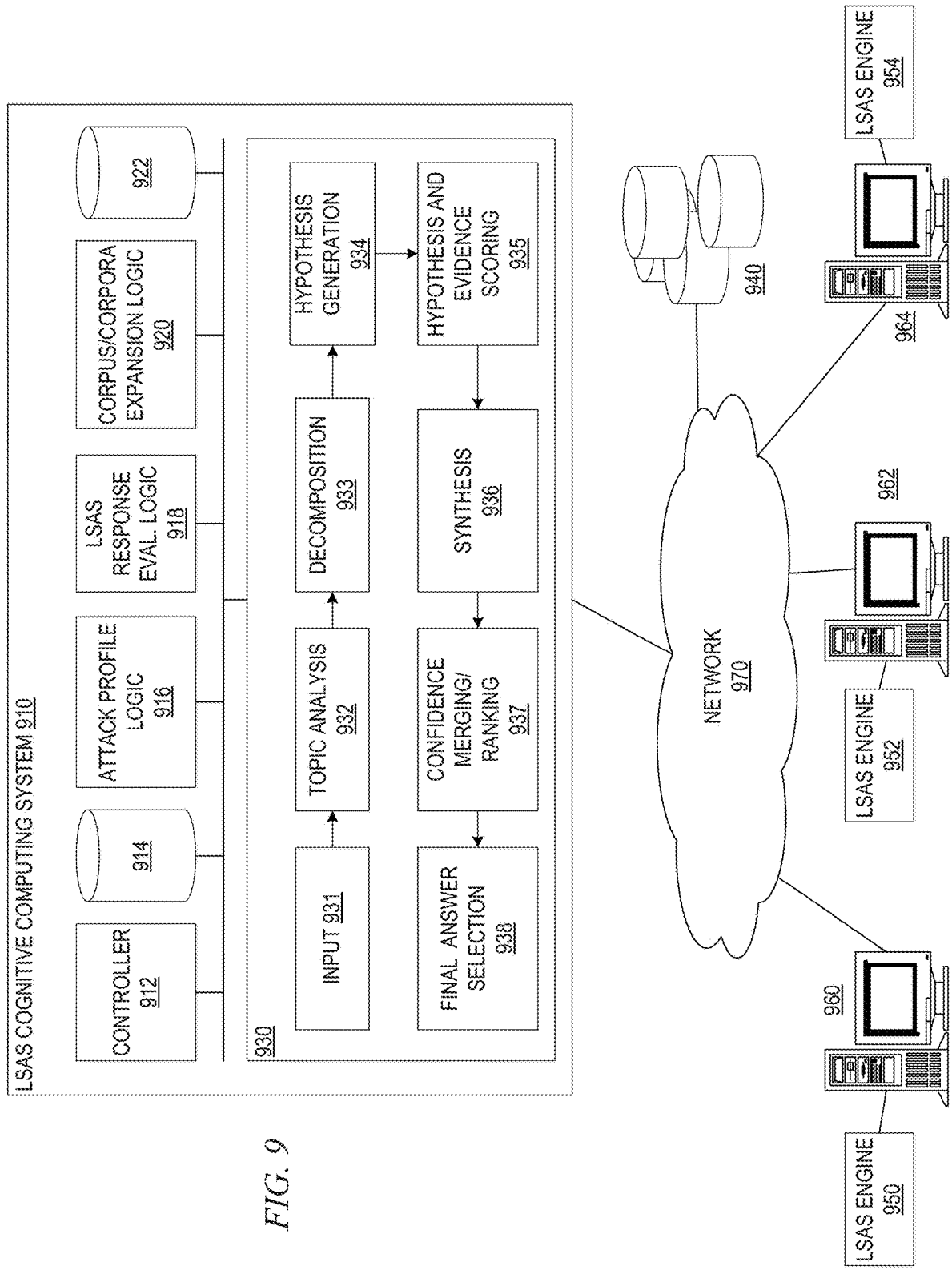
FIG. 9 is an example block diagram of an illustrative embodiment in which a cognitive computing system is utilized to assist the LSAS engines in responding to perceived attacks/intrusions.

FIG. 9 is an example block diagram of an illustrative embodiment in which a cognitive computing system is utilized to assist the LSAS engines in responding to perceived attacks/intrusions. The example embodiment shown in FIG. 9 assumes a centralized cognitive computing system for controlling the operation of LSAS engines of a plurality of segments of a distributed computing system. The centralized cognitive computing system may provide one or more operations for performing at least one of attack profile generation and deployment to the LSAS engines, evaluation of LSAS engine responses, and/or expansion of a corpus or corpora upon which the cognitive computing system operates based on information obtained from one or more LSAS engines. It should be appreciated that in other illustrative embodiments, the cognitive computing system may be implemented as part of a controller, such as controller 410 in LSAS engine 400 such that each LSAS engine 400 has its own controller 410 and thus, own instance of the cognitive computing system.

As shown in FIG. 9, the LSAS cognitive computing system 910 comprises a controller 912, attack profile database 914, attack profile logic 916, LSAS response evaluation logic 918, corpus/corpora expansion logic 920, and cognitive system resource data structure storage 922. In addition, the LSAS cognitive computing system 910 further comprises a question/response processing pipeline 930. The controller 912 controls the overall operation of the LSAS cognitive computing system 910 and orchestrates the operation of the other elements 914-930 in the LSAS cognitive computing system 910. Any operations not specifically attributed to one of the other elements 914-930 may be implemented by logic of the controller 910.

The attack profile database 914 stores attack profiles generated by the attack profile logic 916 of the LSAS cognitive computing system 910 based on cognitive evaluation of content in the corpus or corpora 940, such as may be performed by pipeline 930. The attack profile logic 916 distributes attack profiles generated/updated in the attack profile database 914 to the LSAS engines 950-954 on server computing devices 960-964, via network 970, along with control messages instructing the LSAS engines 950-954 to configure themselves to implement the distributed attack profiles. This may be done in response to an attack profile being generated or updated based on the cognitive operations of the LSAS cognitive computing system 910, on a periodic basis such as a periodic update of the LSAS engines 950-954, or in response to a user input instructing the distribution of attack profiles to LSAS engines 950-954 to be performed.

The LSAS response evaluation logic 918 may receive information from the LSAS engines 950-954 regarding their detected attacks/intrusions and the responses to these detected attacks/intrusions implemented by the LSAS engines 950-954. The LSAS response evaluation logic 918 may evaluate the appropriateness of the response based on a cognitive analysis of information content from the corpus/corpora 940 by the question/response processing pipeline 930. The LSAS response evaluation logic 918 may then send results information back to the LSAS engine 950-954 to inform them of the determined appropriateness and/or potential alternative responses. The LSAS engine 950-954 may then utilize that results information as part of a machine learning process to modify the operating parameters of the logic it implements to cause the LSAS engine 950-954 to implement responses that are more appropriate to the particular attack/intrusion.

The corpus/corpora expansion logic 920 provides logic for receiving information from LSAS engines 950-954 regarding their detected attacks/intrusions and the responses they implemented to the detected attacks/intrusions and expands the corpus/corpora 940 to include such information for future attack profile generation/updating, LSAS response evaluation operations, and the like. The corpus/corpora expansion logic 920 may generate structure or unstructured documents that are stored as part of the corpus/corpora 940.

The cognitive system resource data structure storage 922 stores various resources for use by the LSAS cognitive computing system 910 and its logic elements to perform their various operations. Among these resources may be dictionary data structures, synonym data structures, named entity identification data structures, key feature identification data structures, concept ontologies, and other semantic and syntactic information data structures that may be specifically configured to the domain(s) associated with computing system attacks/intrusions and which may be utilized by the natural language processing and evidence scoring mechanisms of the question/response processing pipeline 930 to perform its cognitive evaluation of the corpus or corpora 940.

The question/response processing pipeline 930 may perform natural language processing, evidence based evaluation and scoring, and ranking of information extracted from content of the corpus/corpora 940, structured or unstructured content, so as to generate/update an attack profile, evaluate a LSAS response, or the like. The question/response processing pipeline 930, in some illustrative embodiments, may be implemented as a question answering (QA) pipeline in which the input question is implied from the particular request for processing received. For example, if a request for processing is to identify known attacks indicated in the corpus or corpora 940, then an implied question may be of the type "What are the known computer system attacks and their characteristics?" If the request is for evaluation of an LSAS response, then an implied question is "Is the response X to the attack Y correct?" Thus, while the pipeline 930 will be described hereafter in the context of an input question, it should be appreciated that the input question need not be posed as a question and may be a request, and that this question/request may be implicit in the request for processing. The example question/request processing pipeline 930 shown in FIG. 9 is provided only as one example of the processing structure that may be implemented to process a natural language input requesting the operation of a cognitive computing system to present a response or result to a natural language input of implicit natural language question/request.

The pipeline 930 may be implemented, for example, with multiple stages of logic configured to perform various natural language processing, evidence evaluation, and ranking operations that are specifically configured for the domain of computing system attack/intrusion by the resources in storage system 922. It should be appreciated that the stages of the pipeline 930 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The pipeline 930 is augmented, for example, in one or more of the stages to implement the improved mechanisms of the illustrative embodiments for generating attack profiles or evaluate the LSAS engine attack responses. Moreover, additional stages may be provided to implement the improved mechanisms, or separate logic from the pipeline 930 may be provided for interfacing with the pipeline 930 and implementing the improved functionality and operations of the illustrative embodiments.

As shown in FIG. 9, the pipeline 930 comprises a plurality of stages 931-938 through which the cognitive system operates to analyze an input question and generate a final response. In an initial input stage 931, the pipeline 930 receives an input, such as an input question/request, that may be presented in a natural language format. In a general domain, for example, the input may be a question for which an answer is desired, e.g., "Who are Washington's closest advisors?" In response to receiving the input question, the next stage of the pipeline 930, i.e. the topic analysis stage 932, parses the input using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic. This NLP operation may be configured to the particular domain of computing system attack/intrusion by the resources of storage system 922.

In addition, the extracted major features include key words and phrases classified into characteristics, such as the focus of the input, the lexical answer type (LAT) of the input, and the like. As referred to herein, a lexical answer type (LAT) is a word in, or a word inferred from, the input that indicates the type of the answer/response, independent of assigning semantics to that word. For example, in the question "What maneuver was invented in the 1500s to speed up the game and involves two pieces of the same color?," the LAT is the string "maneuver." The focus of an input is the part of the input that, if replaced by the answer/response, makes the input a standalone statement. For example, in the question "What drug has been shown to relieve the symptoms of ADD with relatively few side effects?," the focus is "drug" since if this word were replaced with the answer a correct statement is generated, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 9, the identified major features are then used during the decomposition stage 933 to decompose the question into one or more queries that are applied to the corpus/corpora of data/information 940 in order to generate one or more hypotheses, which represent possible answers/responses to the input. The queries are generated in any known or later developed query language, such as the Structure Query Language (SQL), or the like. The queries are applied to one or more databases storing information about the electronic texts, documents, articles, websites, and the like, that make up the corpus/corpora of data/information 940. That is, these various sources themselves, different collections of sources, and the like, represent a different corpus within the corpora 940. There may be different corpora defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus within the corpora 940.

The queries are applied to one or more databases storing information about the electronic texts, documents, articles, websites, and the like, that make up the corpus of data/information. The queries are applied to the corpus of data/information at the hypothesis generation stage 934 to generate results identifying potential hypotheses for answering/responding to the input, which can then be evaluated. That is, the application of the queries results in the extraction of portions of the corpus of data/information matching the criteria of the particular query. These portions of the corpus are then analyzed and used, during the hypothesis generation stage 934, to generate hypotheses for answering/responding to the input. These hypotheses are also referred to herein as "candidate answers" or "candidate responses" for the input. For any input, at this stage 934, there may be hundreds of hypotheses or candidate answers/responses generated that may need to be evaluated.

The pipeline 930, in stage 935, then performs a deep analysis and comparison of the language of the input and the language of each hypothesis or candidate answer/response, as well as performs evidence scoring to evaluate the likelihood that the particular hypothesis is a correct answer/response for the input. As mentioned above, this involves using a plurality of reasoning algorithms, each performing a separate type of analysis of the language of the input and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input or synonyms to that term in the input, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 936, the large number of scores generated by the various reasoning algorithms are synthesized into confidence scores or confidence measures for the various hypotheses. This process involves applying weights to the various scores, where the weights have been determined through training of the statistical model employed by the pipeline 930 and/or dynamically updated. For example, the weights for scores generated by algorithms that identify exactly matching terms and synonyms may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer/response generation.

The weighted scores are processed in accordance with a statistical model generated through training of the pipeline 930 that identifies a manner by which these scores may be combined to generate a confidence score or measure for the individual hypotheses or candidate answers/responses. This confidence score or measure summarizes the level of confidence that the pipeline 930 has about the evidence that the candidate answer/response is inferred by the input, i.e. that the candidate answer/response is the correct answer/response for the input question/request.

The resulting confidence scores or measures are processed by a confidence merging and ranking stage 937 which compares the confidence scores and measures to each other, compares them against predetermined thresholds, or performs any other analysis on the confidence scores to determine which hypotheses are the most likely to be the correct answer/response to the input question. The hypotheses are ranked according to these comparisons to generate a ranked listing of hypotheses. From the ranked listing of hypotheses, at stage 938, a final answer/response and confidence score, or final set of candidate answers/responses and confidence scores, are generated and output to the submitter of the original input question/request.

The pipeline 930 of FIG. 9 may be configured in accordance with the illustrative embodiments to evaluate information in the corpus/corpora 940 regarding computer system attacks/intrusions. Specifically, the pipeline 930 may be configured to identify domain specific features, e.g., key terms/phrases, in natural language content of the corpus/corpora 940 associated attacks/intrusions into computing systems. The instances of mentions of attacks/intrusions may further be analyzed to identify characteristics of the attacks/intrusions as well as any responses to such attacks/intrusions and the effectiveness of such attacks/intrusions. This information may be extracted, as discussed previously, and evaluated using evidence scoring to determine evidence scores for the attack/intrusion as well as individual characteristics of the attacks/intrusions, responses, and effectiveness of such responses. Thus, for each attack/intrusion identified in the content of the corpus/corpora 940, and for each characteristic of such attack/intrusion, a corresponding evidence score may be generated which can then be compared to one or more evidence score threshold values to determine which attacks/intrusions and corresponding characteristics have sufficient evidence to be maintained for use by the LSAS cognitive system 910.

The results of such evaluations may be used by the attack profile logic 916 of the LSAS cognitive computing system 910 to generate an attack profile for the identified attack/intrusion which may then be stored in the attack profile database 914 and distributed to LSAS engines 950-954 via the attack profile logic 916. In other illustrative embodiments the results of the evaluation of the pipeline 930 may be used by the LSAS response evaluation logic 918 to evaluate information obtained from an LSAS engine 950-954 regarding the appropriateness of the response implemented by the LSAS engine 950-954 to a perceived attack/intrusion. These operations have been described above and thus, similar functionality as discussed above may be implemented in the LSAS cognitive computing system 910.

As discussed above, in one example, documents of a corpus may mention an attack/intrusion in natural language content, such as a web page, instant message, electronic mail message, posting on an electronic forum, or the like, and may specify some characteristics of the attack/intrusion, e.g., "A new computer threat from Country X is the ABC attack. It is a type of denial of service attack in which burst traffic is sent with large payloads that tend to shut down the processing capability of network adapters. Connection throttling has been attempted but with limited success." From this example text, it can be determined that there is an attack/intrusion called the ABC attack, that this attack is of the type "denial of service", that the pattern is burst traffic with large payloads, that a response of "throttling" has been performed, but that it has negative success. All of these features may be compiled into an attack profile and may be further evaluated to determine evidence supporting each of these characteristics. If there is sufficient evidence for the various characteristics, they may be maintained in the attack profile. If not, they may be removed, e.g., if there is little evidence that throttling the connection does not work, then this characteristic may be removed from the attack profile.

Similarly, the same analysis may be implemented to evaluate a response implemented by an LSAS engine 950-954. If the determined responses to an attack/intrusion from a corpus matches the response that the LSAS engine 950-954 implemented, then a response may be generated that the LSAS engine 950-954 performed a correct response. If there is a difference in the determined response and the LSAS engine's implemented response, then the differences may be sent to the LSAS engine 950-954 as part of a response notification, which the LSAS engine 950-954 may utilize as feedback input to a machine learning processing to adjust its operational parameters for evaluating attacks/intrusions and/or generating/selecting an appropriate response.

As noted above, an additional functionality of the LSAS cognitive computing system 910 may be to expand the corpus/corpora 940 with information obtained from the LSAS engines 950-954. For example, a LSAS engine 950 may report to the LSAS cognitive computing system 910 that it detected an instance of the ABC attack and implemented a throttling response with a 60% reduction in connection traffic. The LSAS engine 950 may further communicate results information as determined from agents monitoring the segment associated with the LSAS engine 950, e.g., a reduction in the spread of the attack, an isolation of the attack, a blockage of the attack at the edge device, etc., may be detected from metrics gathered by the agent and this information may be reported to the LSAS cognitive computing system 910. This information may be added to the corpus/corpora 940 to indicate that one response to the ABC attack is to throttle the connection with a 60% reduction in traffic. Having been added to the corpus/corpora 940, this information is then available for future determinations and evaluations performed by the LSAS cognitive computing system 910.

Thus, in addition to the biological "swelling" response mechanisms previously described above, some illustrative embodiments further provide features for implementing a cognitive computing system to provide information to the LSAS engines for use in responding to detected attacks/intrusions. In some illustrative embodiments, the cognitive computing system may also provide functionality for evaluating responses implemented by LSAS engines. Still further, some embodiments may expand upon the corpus/corpora used by the cognitive system based on the information obtained from LSAS engines regarding the way in which they respond to detected attacks/intrusions. In this way, a more accurate response to attacks/intrusions with regard to the implementation of biological based "swelling" responses may be achieved.

Figure 10:
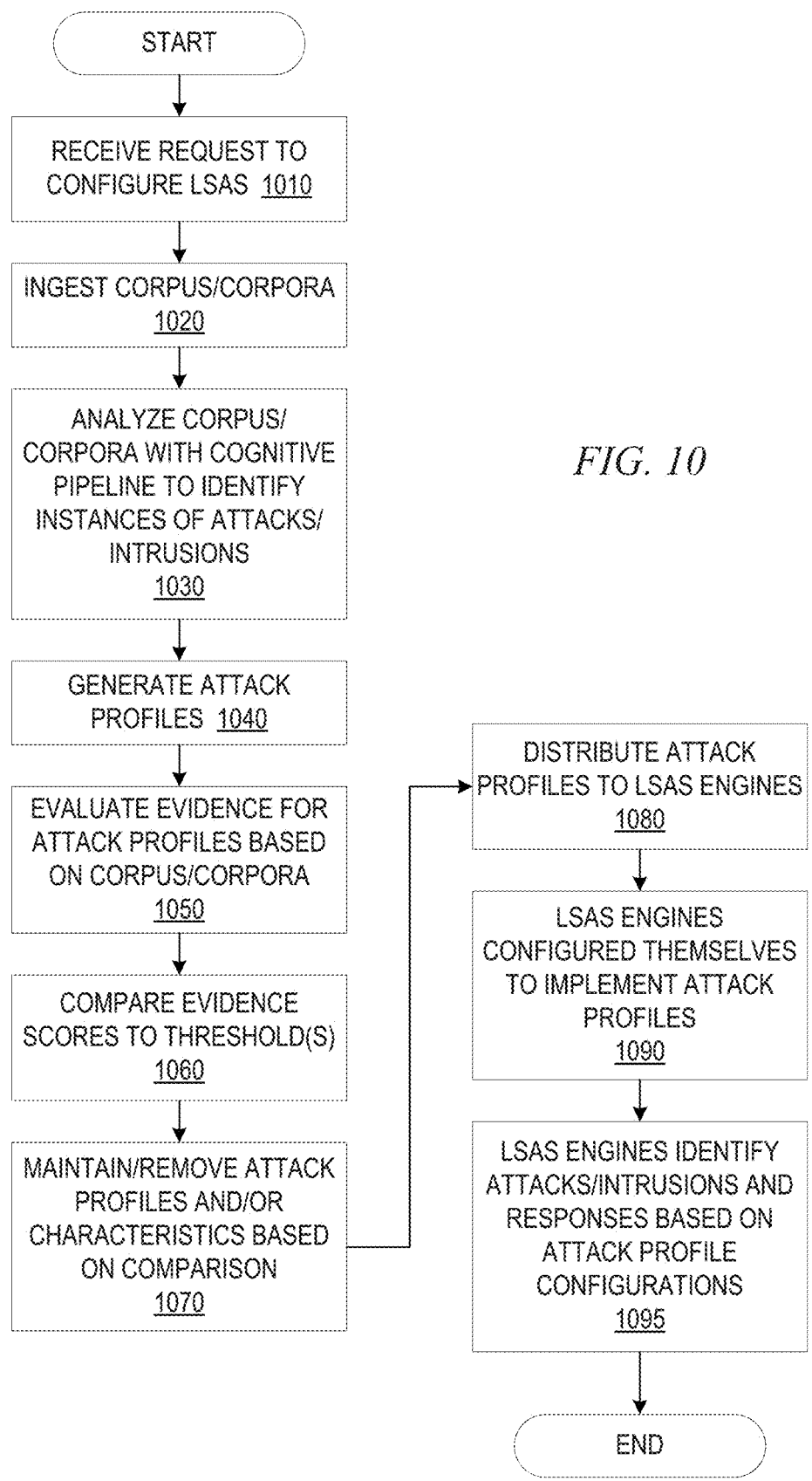
FIG. 10 is a flowchart outlining an example operation for generating an attack profile in accordance with one illustrative embodiment.

FIG. 10 is a flowchart outlining an example operation for generating an attack profile in accordance with one illustrative embodiment. Aspects of the operation outlined in FIG. 10 may be performed by the LSAS cognitive computing system of FIG. 9, for example, such as by utilizing attack profile logic 916 and pipeline 930.

As shown in FIG. 10, the operation starts by receiving a request to configure an LSAS engine with attack profile information (step 1010). This request may be an automated or scheduled request such that the operation is performed on a periodic basis automatically to thereby update the configuration of an LSAS engine with the most recent information from the corpus or corpora. In other illustrative embodiments, this request may be automatically generated in response to a change to the corpus or corpora or in response to the reporting of a potential attack/intrusion which an LSAS engine does not recognize by the LSAS engine. Alternatively, this request may be a manually entered request by a user specifically requesting the update or initial configuration of an LSAS engine be performed.

In response to the request, a corpus of content for a computer attack/intrusion domain is ingested (step 1020) and analyzed by a cognitive computing system pipeline to identify instances of mentions of computer attacks/intrusions and their corresponding characteristics (step 1030). For each identified attack/intrusion, a corresponding attack profile is generated specifying characteristics of the attack/intrusion, characteristics of responses to the attack/intrusion, and the like (step 1040). The characteristics of the attack profiles are evaluated based on evidential passages in the corpus or corpora to determine evidential scores for the attack/intrusion as a whole and/or individual characteristics of the attack profile (step 1050). The evidential scores are compared to one or more evidential score threshold values (step 1060). Those attacks/intrusions and/or characteristics that have evidential scores meeting or exceeding requirements of the one or more evidential score threshold values may be maintained in the attack profile while others that do not are removed (step 1070).

The resulting attack profiles are distributed to one or more LSAS engines (step 1080) which configure themselves to implement the attack profiles (step 1090). Thereafter, the LSAS engines may identify attacks/intrusions and select appropriate "swelling" responses of segmentation, dilution, and scaffolding based on the attack profiles (step 1095). The operation then terminates.

Figure 11:
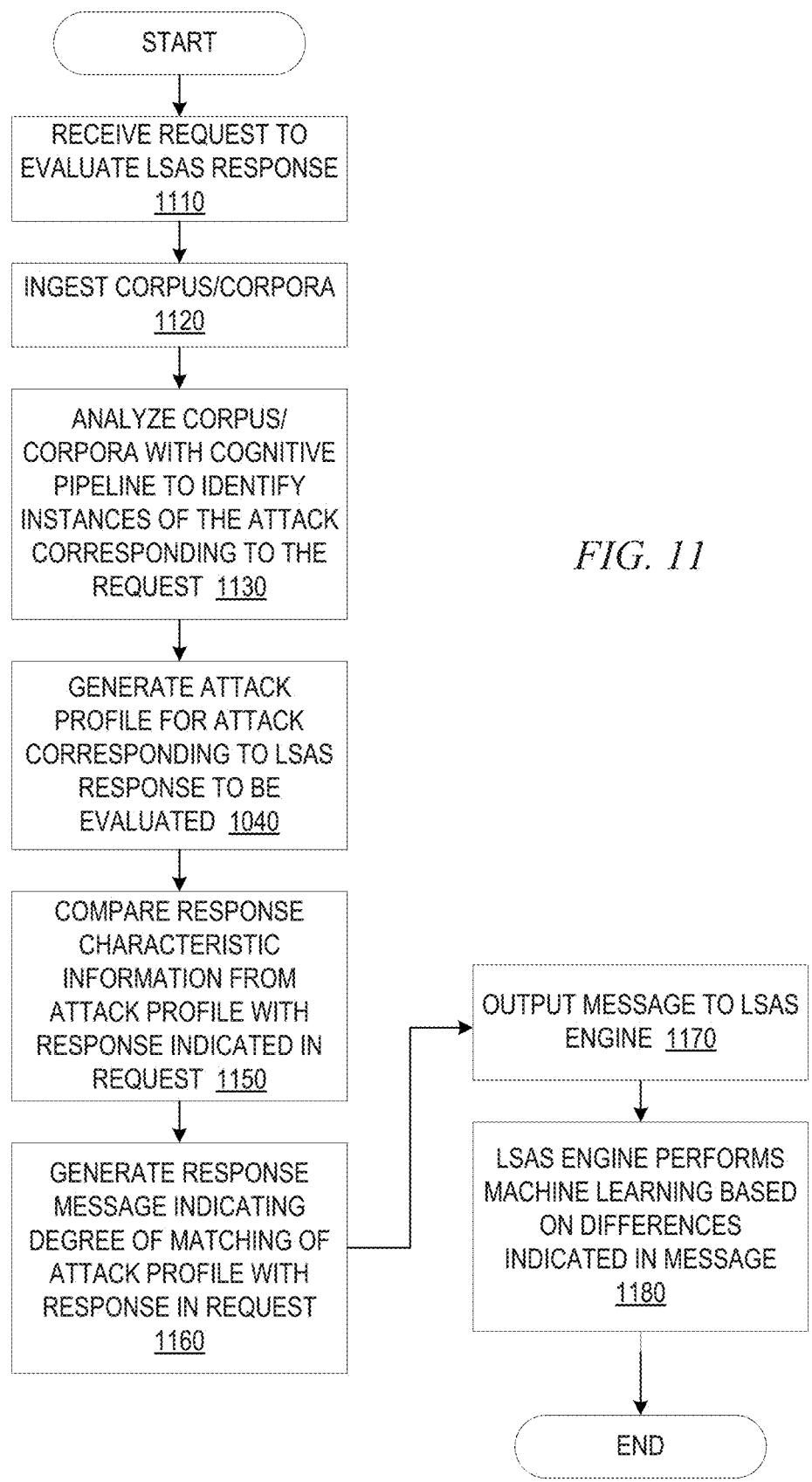
FIG. 11 is a flowchart outlining an example operation for evaluating a LSAS response in accordance with one illustrative embodiment.

FIG. 11 is a flowchart outlining an example operation for evaluating a LSAS response in accordance with one illustrative embodiment. Aspects of the operation outlined in FIG. 11 may be performed by the LSAS cognitive computing system of FIG. 9, for example, such as by utilizing LSAS response evaluation logic 918 and pipeline 930.

As shown in FIG. 11, the operation starts by receiving a request to evaluate an LSAS response (step 1110). This request may be received, for example, from the LSAS engine that implemented the response. Alternatively, an administrator may request that a LSAS engine's response be evaluated. In any case, the request preferably indicates the identify and/or type of the attack/intrusion as well as characteristics of the response that was implemented to address the attack/intrusion.

In response to the request, a corpus or corpora of content is ingested (step 1120) and analyzed by a cognitive pipeline to identify instances of the attack corresponding to the request (step 1130). An attack profile for the attack is generated based on the instances found in the corpus and the associated characteristics (step 1140). The generation of the attack profile may be performed in a similar manner as previously described with regard to FIG. 10, for example.

The response characteristics information from the attack profile are compared to the response characteristics indicated in the request (step 1150). A response to the request is then generated based on the degree of matching of the attack profile characteristic information with the attack/response characteristic information included in the request (step 1160). The message is output to the LSAS engine that implemented the response (step 1170), and the LSAS engine performs machine learning based on differences between the attack profile and the LSAS engine's implemented response as indicated in the message (step 1180). The operation then terminates.

Figure 12:
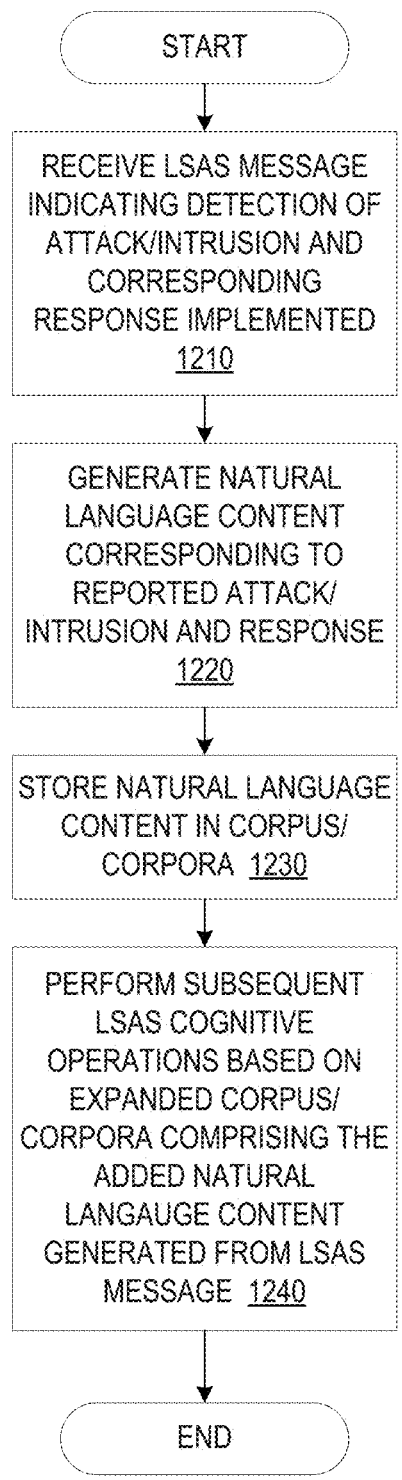
FIG. 12 is a flowchart outlining an example operation for expanding a corpus with information from an LSAS engine in accordance with one illustrative embodiment.

FIG. 12 is a flowchart outlining an example operation for expanding a corpus with information from an LSAS engine in accordance with one illustrative embodiment. Aspects of the operation outlined in FIG. 12 may be performed by the LSAS cognitive computing system of FIG. 9, for example, such as by utilizing the corpus/corpora expansion logic 920.

As shown in FIG. 12, the operation starts by receiving an LSAS message indicating detection of an attack/intrusion and the corresponding response implemented by the LSAS engine (step 1210). This LSAS message may be received from the LSAS engine that implemented the response, for example. A natural language content is generated based on the reported attack/intrusion and response information indicated in the LSAS message (step 1220). The natural language content is then stored in the corpus/corpora (step 1230). The LSAS cognitive computing system may then perform subsequent LSAS cognitive operations based on the expanded corpus/corpora comprising the added natural language content generated form the LSAS message (step 1240). The operation then terminates.

In some cases the mechanisms of the illustrative embodiments may be used with a blockchain cryptographic mechanism or other ledger-type cryptographic mechanism. Blockchain technology, also referred to herein as "blockchaining", involves the creation of a ledger of transactions, referred to as a blockchain, that may be relied upon by the parties involved in the transactions as a secure representation of the transactions that occurred. That is, a blockchain is a data structure that makes it possible to create a digital ledger of transactions and share the digital ledger among a distributed network of computers. Blockchain technology uses cryptography to allow each part on the network of computers to manipulate the ledger in a secure way without the need for a central authority. Once a block of data is recorded on the blockchain ledger, it is extremely difficult to change or remove. When something is to be added to the blockchain ledger, participants in the network, all of which have copies of the existing blockchain data structure, run algorithms to evaluate and verify the proposed transaction. If a majority of the participants agree that the transaction is valid i.e. identifying information matches the blockchain's history, then the new transaction will be approved and a new block added to the blockchain.

With the mechanisms of the illustrative embodiments, the blockchain technology may be used to reinforce and secure the inter and intra segment communications between the nodes and components of the computing system. Moreover, blockchain technology may be used as a means of storing, transmitting, actuating, and activating/deactivating software or components of the computing system. In contrast with a centralized system, the blockchain technology is similar to the biologic principals of ionic (as compared to electronic) charge communication as well as the idea that DNA is both added on and accreted, and can invoke certain portions in response to environmental conditions.

Thus, with the mechanisms of the illustrative embodiments, even if communications are completely stalled due to an attack or a response to an attack by the mechanisms of the illustrative embodiments, the blockchain technology at least has an immutable history which can aid restart or independent activity. In addition, code elements on, or securely referenced by the blockchain, can be added to and/or invoked when necessary. The blockchain technology can securely, and immutably, carry information between internal and external components of a segment of a computing system.

As noted above, the mechanisms of the illustrative embodiments utilize specifically configured computing devices, routers, switches, dedicated hardware and/or software devices, or other data processing systems, to perform the operations for providing segmentation, dilution, and/or scaffolding response to a detected attack or intrusion, such as via a LSAS engine. These computing devices, routers, switches, dedicated hardware/software devices, or other data processing systems, may comprise various hardware elements which are specifically configured, either through hardware configuration, software configuration, or a combination of hardware and software configuration, to implement one or more of the systems/subsystems described herein.

It should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor to configure the data processing system to implement a local segment analysis and security (LSAS) cognitive computing system that performs the method, comprising:
ingesting, by the LSAS cognitive computing system, an electronic corpus of content, wherein the electronic corpus of content comprises content specific to a domain of computer system attacks;
performing, by the LSAS cognitive computing system, cognitive analysis of the content of the electronic corpus to identify at least one instance of a reference to a computer attack and at least one corresponding characteristic of the computer attack, wherein the cognitive analysis comprises performing natural language processing on natural language content in the content of the electronic corpus to identify and extract the at least one instance of the reference to the computer attack and the at least one corresponding characteristic in the natural language content, wherein the at least one instance of the reference to the computer attack comprises a natural language term or phrase specifying the identifier of the computer attack, and wherein the at least one corresponding characteristic comprises one or more characteristics indicative of a severity of the corresponding computer attack;
generating, by the LSAS cognitive computing system, an attack profile data structure for the computer attack based on the at least one corresponding characteristic of the computer attack identified by the cognitive analysis of the content of the electronic corpus, wherein the attack profile data structure specifies the identity of the computer attack and a corresponding severity of the computer attack; and
configuring, by the LSAS cognitive computing system, at least one LSAS engine associated with a segment of a distributed computing system based on the attack profile data structure, wherein the at least one LSAS engine determines a security response action to implement based on the attack profile data structure and transmits a control message to at least one computing resource to implement the determined security response action in response to detecting the computer attack, wherein the security response action is determined based on the corresponding severity of the computer attack specified in the attack profile data structure.

2. The method of claim 1, wherein the determined security response action is at least one of a segmentation security response action, a dilution security response action, or a scaffolding security response action.

3. The method of claim 2, wherein the determined security response action comprises a segmentation security response action and a dilution security response action, wherein the segmentation security response is followed by the dilution security response action in response to a severity of the attack being determined to increase equal to or greater than a predetermined threshold.

4. The method of claim 1, wherein performing cognitive analysis of the content of the electronic corpus comprises:
generating, for each of the at least one corresponding characteristics of the computer attack, an evidence score based on an evaluation of evidential support for the at least one corresponding characteristics in electronic documents of the electronic corpus;
comparing each of the evidence scores for each of the corresponding characteristics in the at least one corresponding characteristics to a threshold value; and
based on results of the comparison, maintaining, in the attack profile data structure, corresponding characteristics whose evidence scores meet a requirement of the threshold value, and discarding characteristics whose evidence scores do not meet the requirement of the threshold value.

5. The method of claim 1, wherein the at least one corresponding characteristic of the computer attack comprises at least one of a name of the computer attack, an origin of the computer attack, a type of the computer attack, a recognizable pattern of data activity or computing system activity indicative of the computer attack, a severity of the computer attack, a security response to the computer attack, a successfulness of a response to the computer attack, or a response recommendation for responding to the computer attack.

6. The method of claim 1, wherein the LSAS cognitive computing system stores a plurality of attack profile data structures, for a plurality of different computer attacks, wherein each attack profile data structure is generated based on a cognitive analysis of the content of the electronic corpus with regard to a corresponding computer attack.

7. The method of claim 6, further comprising:
receiving, by the data processing system, an indicator of a security response, to a detected computer attack, performed by a LSAS engine in the at least one LSAS engine;
comparing the indicator of the security response to an attack profile corresponding to the detected computer attack; and
returning a response to the LSAS engine indicating whether or not the security response performed by the LSAS engine is a correct security response to the detected computer attack based on results of the comparison.

8. The method of claim 7, wherein returning the response to the LSAS engine comprises, in response to results of the comparison indicating that the security response performed by the LSAS engine is not a correct security response, determining an alternative correct security response to the detected computer attack and specifying the alternative correct security response in the response returned to the LSAS engine.

9. The method of claim 8, further comprising performing a machine learning operation in the LSAS engine to modify at least one operational parameter of the LSAS engine based on the alternative correct security response specified in the response returned to the LSAS engine.

10. The method of claim 6, further comprising:
receiving, by the data processing system, an indicator of a security response, to a detected computer attack, performed by a LSAS engine in the at least one LSAS engine; and
expanding the electronic corpus to include natural language content corresponding to the security response performed by the LSAS engine.

11. A computer program product comprising a computer readable storage medium having a computer readable program stored therein, wherein the computer readable program, when executed on a computing device, causes the computing device to:
ingest an electronic corpus of content, wherein the electronic corpus of content comprises content specific to a domain of computer system attacks;
perform cognitive analysis of the content of the electronic corpus to identify at least one instance of a reference to a computer attack and at least one corresponding characteristic of the computer attack, wherein the cognitive analysis comprises performing natural language processing on natural language content in the content of the electronic corpus to identify and extract the at least one instance of the reference to the computer attack and the at least one corresponding characteristic in the natural language content, wherein the at least one instance of the reference to the computer attack comprises a natural language term or phrase specifying the identifier of the computer attack, and wherein the at least one corresponding characteristic comprises one or more characteristics indicative of a severity of the corresponding computer attack;
generate an attack profile data structure for the computer attack based on the at least one corresponding characteristic of the computer attack identified by the cognitive analysis of the content of the electronic corpus, wherein the attack profile data structure specifies the identity of the computer attack and a corresponding severity of the computer attack; and
configure at least one local segment analysis and security (LSAS) engine associated with a segment of a distributed computing system based on the attack profile data structure, wherein the at least one LSAS engine determines a security response action to implement based on the attack profile data structure and transmits a control message to at least one computing resource to implement the determined security response action in response to detecting the computer attack, wherein the security response action is determined based on the corresponding severity of the computer attack specified in the attack profile data structure.

12. The computer program product of claim 11, wherein the determined security response action is at least one of a segmentation security response action, a dilution security response action, or a scaffolding security response action.

13. The computer program product of claim 11, wherein the computer readable program further causes the computing device to perform cognitive analysis of the content of the electronic corpus at least by:
generating, for each of the at least one corresponding characteristics of the computer attack, an evidence score based on an evaluation of evidential support for the at least one corresponding characteristics in electronic documents of the electronic corpus;
comparing each of the evidence scores for each of the corresponding characteristics in the at least one corresponding characteristics to a threshold value; and
based on results of the comparison, maintaining, in the attack profile data structure, corresponding characteristics whose evidence scores meet a requirement of the threshold value, and discarding characteristics whose evidence scores do not meet the requirement of the threshold value.

14. The computer program product of claim 11, wherein the at least one corresponding characteristic of the computer attack comprises at least one of a name of the computer attack, an origin of the computer attack, a type of the computer attack, a recognizable pattern of data activity or computing system activity indicative of the computer attack, a severity of the computer attack, a security response to the computer attack, a successfulness of a response to the computer attack, or a response recommendation for responding to the computer attack.

15. The computer program product of claim 11, wherein the computing device stores a plurality of attack profile data structures, for a plurality of different computer attacks, wherein each attack profile data structure is generated based on a cognitive analysis of the content of the electronic corpus with regard to a corresponding computer attack.

16. The computer program product of claim 15, wherein the computer readable program further causes the computing device to:
receive an indicator of a security response, to a detected computer attack, performed by a LSAS engine in the at least one LSAS engine;
compare the indicator of the security response to an attack profile corresponding to the detected computer attack; and
return a response to the LSAS engine indicating whether or not the security response performed by the LSAS engine is a correct security response to the detected computer attack based on results of the comparison.

17. The computer program product of claim 16, wherein returning the response to the LSAS engine comprises, in response to results of the comparison indicating that the security response performed by the LSAS engine is not a correct security response, determining an alternative correct security response to the detected computer attack and specifying the alternative correct security response in the response returned to the LSAS engine.

18. The computer program product of claim 17, wherein the computer readable program further causes the LSAS engine to perform a machine learning operation to modify at least one operational parameter of the LSAS engine based on the alternative correct security response specified in the response returned to the LSAS engine.

19. An apparatus comprising:
a processor; and
a memory coupled to the processor, wherein the memory comprises instructions which, when executed by the processor, cause the processor to:
ingest an electronic corpus of content, wherein the electronic corpus of content comprises content specific to a domain of computer system attacks;
perform cognitive analysis of the content of the electronic corpus to identify at least one instance of a reference to a computer attack and at least one corresponding characteristic of the computer attack, wherein the cognitive analysis comprises performing natural language processing on natural language content in the content of the electronic corpus to identify and extract the at least one instance of the reference to the computer attack and the at least one corresponding characteristic in the natural language content, wherein the at least one instance of the reference to the computer attack comprises a natural language term or phrase specifying the identifier of the computer attack, and wherein the at least one corresponding characteristic comprises one or more characteristics indicative of a severity of the corresponding computer attack;
generate an attack profile data structure for the computer attack based on the at least one corresponding characteristic of the computer attack identified by the cognitive analysis of the content of the electronic corpus, wherein the attack profile data structure specifies the identity of the computer attack and a corresponding severity of the computer attack; and
configure at least one local segment analysis and security (LSAS) engine associated with a segment of a distributed computing system based on the attack profile data structure, wherein the at least one LSAS engine determines a security response action to implement based on the attack profile data structure and transmits a control message to at least one computing resource to implement the determined security response action in response to detecting the computer attack, wherein the security response action is determined based on the corresponding severity of the computer attack specified in the attack profile data structure.

20. The method of claim 1, wherein there are a plurality of LSAS engines in the LSAS cognitive computing system, and wherein each LSAS engine is associated with a different segment of the distributed data processing system and monitors operations of computing resources in a segment with which it is associated, wherein the method further comprises:
determining, by the at least one LSAS engine, that an attack has targeted at least one target computing resource in an associated segment of the distributed data processing system associated with the at least one LSAS engine, based on the attack profile data structure;
in response to determining that the attack has targeted at least one target computing resource in the associated segment, transmitting, by the at least one LSAS engine, the control message to the at least one computing resource to implement a segmentation security response action that performs at least one of inter-segment or intra-segment throttling of data flows to or from the at least one target computing resource or the associated segment;
determining a severity of the attack on the at least one target computing resource based on a trend analysis of history data of at least one of the associated segment or other segments in the distributed data processing system; and
in response to the severity of the attack increasing from a previous severity of the attack based on the trend analysis, increasing a level of inter-segment or intra-segment throttling of data flows to or from the at least one target computing resource or the associated segment.

21. The method of claim 20, wherein the security response action further comprises a dilution security response action, in response to the severity of the attack increasing above a first dilution security threshold, and wherein the dilution security response comprises at least one of:
introducing innocuous messages into data flows to computing resources of the associated segment, wherein the innocuous messages are processed as normal messages but do not affect a state of the computing resources in the segment;
sandboxing data flows to the computing resources of the associated segment to redirect the data flows to a sandbox computing resource; or
creating a honeypot data set and redirecting data flows targeting the computing resources of the associated segment to the honeypot data set.

22. The method of claim 21, wherein the dilution security response action comprises first introducing innocuous messages into the data flows to computing resources of the associated segment in response to the severity of the attack increasing above the first dilution security threshold, followed by at least one of sandboxing data flows or creating a honey pot in response to a severity of the attack increasing equal to or above a second dilution severity threshold.

* * * * *